(12) United States Patent
Fok et al.

(10) Patent No.: US 8,225,093 B2
(45) Date of Patent: Jul. 17, 2012

(54) PROVIDING SECURE INTER-APPLICATION COMMUNICATION FOR A MOBILE OPERATING ENVIRONMENT

(75) Inventors: Kenny Fok, San Diego, CA (US); Jihyun Hwang, Arcadia, CA (US); Eric Chi Chung Yip, San Diego, CA (US); Mikhail A. Lushin (Misha), San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 918 days.

(21) Appl. No.: 11/947,738

(22) Filed: Nov. 29, 2007

(65) Prior Publication Data
US 2008/0215883 A1  Sep. 4, 2008

Related U.S. Application Data

(60) Provisional application No. 60/868,701, filed on Dec. 5, 2006, provisional application No. 60/894,897, filed on Mar. 14, 2007.

(51) Int. Cl.
*H04L 9/32* (2006.01)
*H04L 29/06* (2006.01)

(52) U.S. Cl. .................. 713/168; 713/150; 713/170

(58) Field of Classification Search ............... 713/168, 713/170, 150
See application file for complete search history.

(56) References Cited

U.S. PATENT DOCUMENTS 6,463,154 B1  10/2002  Patel
6,801,941 B1  10/2004  Stephens et al.
2006/0136901 A1  6/2006  Nichols
2010/0088504 A1*  4/2010  Brown et al. ................. 713/151
2010/0091993 A1*  4/2010  Iwama ......................... 380/273
2010/0138661 A1*  6/2010  Tsai et al. .................... 713/171
2010/0205436 A1*  8/2010  Pezeshki ...................... 713/168
2012/0045060 A1*  2/2012  Maestrini et al. ............ 380/274

FOREIGN PATENT DOCUMENTS
GB  2357227  6/2001
(Continued)

OTHER PUBLICATIONS

Handshake time and transmission rate of 802.11g measurement in vehicular networks; Lei Zhao; Xiaoyan Hong; Bo Gu; Local Computer Networks (LCN), 2010 IEEE 35th Conference on; Publication Year: 2010 , pp. 730-736.*

(Continued)

*Primary Examiner* — David Y Jung
(74) *Attorney, Agent, or Firm* — Won Tae Kim

(57) ABSTRACT

Providing for secure and efficient communication for mobile applications executed in a mobile operating environment is described herein. As an example, a primary mobile application can initiate a handshake that includes a unique identifier of the primary application and a random number for signing and/or certifying responsive requests. A recipient application can reference the unique identifier with a list of certified primary applications to verify the primary application. If verified, the recipient responds with the random number and a second random number that can sign and/or certify data requests sent by the primary application. According to some embodiments, random numbers can be hashed and/or truncated to provide low power encryption for such numbers. Further, round-trip policies can be enforced to provide reliable transmission of data. Accordingly, reliable, secure and low power synchronous communication can be conducted in a mobile environment.

50 Claims, 14 Drawing Sheets

FOREIGN PATENT DOCUMENTS

| JP | 2002132722 A | 5/2002 |
| --- | --- | --- |
| JP | 2003208409 A | 7/2003 |
| JP | 2004528609 A | 9/2004 |
| JP | 2005244668 A | 9/2005 |
| WO | 0190838 | 11/2001 |
| WO | WO2006071267 A1 | 7/2006 |

OTHER PUBLICATIONS

Simple mobility support for IPsec tunnel mode; Byoung-Jo, K.; Srinivasan, S.; Vehicular Technology Conference, 2003. VTC 2003-Fall. 2003 IEEE 58th; vol. 3; Publication Year: 2003, pp. 1999-2003 vol. 3.*

Integrated transport layer security: end-to-end security model between WTLS and TLS ; Eun-Kyeong Kwon; Yong-Gu Cho; Ki-Joon Chae; Information Networking, 2001. Proceedings. 15th International Conference on ; Publication Year: 2001, pp. 65-71.*

International Search Report—PCT/US07/086418—International Search Authority—European Patent Office—Jun. 26, 2008.

Written Opinion—PCT/US07/086418—International Search Authority—European Patent Office, Munich—Jun. 26, 2008.

Baris Kayayurt et al: "End to End Security Implementation for Mobile Devices Using TLS Protocol." Journal in Computer Virology, Springer-Verlag, PA. vol. 2, No. 1, Jul. 11, 2006. XP019411435, pp. 87-96.

Menezes et al., Handbook of Applied Cryptography, Chapter. 10, CRC Press (1996).

* cited by examiner

PROVIDING SECURE INTER-APPLICATION COMMUNICATION FOR A MOBILE OPERATING ENVIRONMENT

CROSS REFERENCE TO RELATED APPLICATIONS

The present Application for Patent claims priority to Provisional Application No. 60/868,701 entitled METHOD AND APPARATUS FOR ESTABLISHING A TRUSTED COMMUNICATION BETWEEN TWO APPLICATIONS ON A SINGLE PLATFORM and filed Dec. 5, 2006, and to Provisional Application No. 60/894,897 entitled METHOD AND APPARATUS FOR INTER APPLICATIONS COMMUNICATION and filed Mar. 14, 2007, assigned to the assignee hereof and hereby expressly incorporated by reference herein.

BACKGROUND

1. Field

The following description relates generally to mobile device applications and wireless communication, and more particularly to providing secure data exchange between mobile applications operating on one or more mobile platforms.

2. Background

In recent years, a variety of advancements has occurred in cellular communication technology and cellular communication devices. Some of the advancements, such as integration of camera and video recording technology onto such devices, incorporation of e-mail and short messaging services into mobile communication, and the like, involve software and/or hardware applications. These applications have added increased flexibility, processing power, communication capabilities and so forth, to already popular communication devices (e.g., cellular telephones). As a result, such devices have become more popular in a consumer marketplace, motivating larger numbers of consumers to purchase such devices, or to upgrade to devices that include new applications and technologies.

In addition, various types of malicious software (malware) generally encumber electronic communication. Some malware is relatively innocuous, merely monitoring user activity to assist in developing new products and compiling commercial and marketing strategies to make those products appealing to consumers. While monitoring programs typically do not cause damage to an operating environment or stored data, they can, taken together, consume processing resources of an electronic device. Some malware, however, can actively damage device operating environments, corrupt data, steal passwords, user information, and so on. They can operate by various mechanisms, but typically either write themselves into authentic programs on a device, mask themselves to appear as such programs or the like. Due to the effect of malicious software, various mechanisms for securing communication in electronic operating environments have arisen. Mobile devices are no exception to dangers posed by spoofing programs and other malware, and typically benefit from secure communication. Although mobile

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

The subject disclosure provides secure and efficient communication for mobile applications executed in a mobile operating environment. As an example, a primary mobile application can initiate a handshake that includes a unique identifier of the primary application and a random number for signing and/or certifying responsive communication received by the primary mobile application. A recipient application can reference the unique identifier with a list of certified primary applications to verify the primary application. If the unique identifier is verified, the recipient application responds to the handshake with the random number and a second random number that can be utilized to sign and/or certify subsequent communication submitted to the recipient application. In addition to the foregoing, the primary application and recipient application can delay a request and/or response until a corresponding response or request, respectively, is received or sent. Accordingly, synchronous communication between the applications can be conducted.

According to additional aspects of the subject disclosure, random numbers generated to identify an initiating or recipient application can be incremented for successive communication. A response should contain an appropriate increment of the random number for the response to be verified. As a result, the subject disclosure provides for round-trip communication where each round-trip is identified by an increment of a random number, and each round-trip is complete before a subsequent round-trip is initiated.

According to still other aspects, random numbers can be hashed and/or truncated in order to obscure the numbers and provide additional security against unauthorized applications. Additionally, because hash functions require very low processing compared with other encryption/decryption mechanisms, the subject disclosure can provide for secure data transfer between mobile applications in an efficient manner involving relatively low power consumption compared with conventional techniques. According to still other aspects, mobile applications can be executed on a single operating device, such as a cellular telephone, or upon remote operating devices, such as separate cellular telephones, or the like, connected by a mobile network, a transmission control protocol/Internet protocol (TCP/IP) network, and so on.

According to other aspects, disclosed is a method for providing transmission of data between applications in a mobile operating environment. The method can include initiating a handshake with a mobile application that includes a unique identifier of a primary mobile application and a random number generated for the handshake and receiving a response to the handshake that includes a first number and a second number, the second number is randomly generated by the mobile application. The method can further include verifying that the first number is the random number generated for the handshake and sending a data event to the mobile application that includes an increment of the second number if the first number is verified as the random number. Moreover, the method can also include waiting for a data event response from the mobile application that includes at least the increment of the second number prior to sending a second data event.

According to additional aspects, disclosed is an apparatus for providing transmission of data between applications in a mobile operating environment. The apparatus can include a secure session module configured to initiate a handshake with a recipient application, wherein the handshake includes a unique ID of a primary application and a random number. Further, the apparatus can include a verification module configured to receive a response to the handshake, wherein the response includes a response number and a second random number, and to determine whether the response number is the random number or an increment of the second random number. Additionally, the apparatus can include a communication module configured to send a data event to the recipient application, if the response number is verified as the random number or an increment of the second random number, including an increment of the second random number. Moreover, the apparatus can also include a transmission management module configured to enable the communication module to send a second data event if a data event response from the recipient application that includes at least the increment of the second number is received.

According to still other aspects, least one processor that provides transmission of data between applications in a mobile operating environment is disclosed. The processor(s) can include a first module that initiates a handshake with a mobile application that includes a unique identifier of a primary mobile application and a random number generated for the handshake and a second module that receives a response to the handshake that includes a first number and a second number, the second number is randomly generated by the mobile application. Additionally, the processor(s) can include a third module that verifies whether the first number is the random number generated for the handshake and a fourth module that sends a data event to the mobile application that includes an increment of the second number if the first number is verified as the random number. In addition to the foregoing, the processor(s) can include a fifth module that waits for a data event response from the mobile application that includes at least the increment of the second number prior to enabling a second data event to be sent.

In accordance will still other aspects, described is an apparatus that provides transmission of data between applications in a mobile operating environment. The apparatus can include means for initiating a handshake with a mobile application that includes a unique identifier of a primary mobile application and a random number generated for the handshake and means for receiving a response to the handshake that includes a first number and a second number, the second number is randomly generated by the mobile application. Further, the apparatus can also include means for verifying whether the first number is the random number generated for the handshake and means for sending a data event to the mobile application that includes an increment of the second number if the first number is verified as the random number. Additionally, the apparatus can include means for delaying a second data event to be sent until receiving a data event response from the mobile application that includes at least the increment of the second number.

According to at least one aspect, disclosed is a computer program product that includes a computer-readable medium containing instructions for providing data transmission security for mobile environment applications. The computer-readable medium can include a first set of instructions configured to cause a computer to initiate a handshake with a mobile application that includes a unique identifier of a primary mobile application and a random number generated for the handshake. Additionally, the computer-readable medium can include a second set of instructions configured to cause a computer to receive a response to the handshake that includes a first number and a second number, the second number is randomly generated by the mobile application. Moreover, the computer-readable medium can include a third set of instructions configured to cause a computer to send a data event to the mobile application that includes an increment of the second number if the first number is verified as the random number. In addition to the foregoing, the computer-readable medium can also include a fourth set of instructions configured to cause a computer to wait for a data event response from the mobile application that includes at least the increment of the second number prior to enabling a second data event to be sent.

According to one or more other aspects, described is a method for providing data transmission between applications in a mobile operating environment. The method can include receiving a handshake request from a primary application that includes a unique ID of the primary application or a random number generated by the primary application and referencing the unique ID against a list of trusted primary application identifiers. In addition, the method can include sending a handshake response to the primary application if the unique ID matches an ID of the list of trusted primary application identifiers and receiving a data event request. Additionally, the method can further include responding to the data event request prior to receiving additional data event requests.

According to additional aspects, disclosed is an apparatus that provides data transmission between applications in a mobile operating environment. The apparatus can include a security module configured to receive a handshake request from a primary application that includes a unique ID of the primary application or a random number generated by the primary application. Further, the apparatus can include a reference module configure to verify the unique ID against a list of trusted primary application identifiers and an interface module configured to send a handshake response to the primary application if the unique ID matches an ID of the list of trusted primary application identifiers and configured to receive a data event request. In addition to the foregoing, the apparatus can also include a management module configured require the interface to respond to the data event request prior to receiving additional data event requests.

According to still other aspects, at least one processor that provides data transmission between applications in a mobile operating environment is described. The processor(s) can include a first module that receives a handshake request from a primary application that includes a unique ID of the primary application or a random number generated by the primary application and a second module that references the unique ID against a list of trusted primary application identifiers. Further, the processor(s) can include a third module that sends a handshake response to the primary application if the unique ID matches an ID of the list of trusted primary application identifiers and a fourth module that receives a data event request. Additionally, the processor(s) can include a fifth module that responds to the data event request prior to receiving additional data event requests.

According to one or more additional aspects, an apparatus that provides data transmission between applications in a mobile operating environment. The apparatus can include means for receiving a handshake request from a primary application that includes a unique ID of the primary application or a random number generated by the primary application and means for referencing the unique ID against a list of trusted primary application identifiers. Further, the apparatus can include means for sending a handshake response to the primary application if the unique ID matches an ID of the list of trusted primary application identifiers and means for receiving a data event request. Moreover, the apparatus can also include means for delaying receipt of additional data event requests until a response to the data event request is received.

According to further aspects, described is a computer program product that includes a computer-readable medium containing instructions for providing data transmission between applications in a mobile operating environment. Specifically, the computer-readable medium can include a first set of instructions configured to cause a computer to receive a handshake request from a primary application that includes a unique ID of the primary application or a random number generated by the primary application. The computer-readable medium can also include a second set of instructions configured to cause a computer to reference the unique ID against a list of trusted primary application identifiers and a third set of instructions configured to cause a computer to send a handshake response to the primary application if the unique ID matches an ID of the list of trusted primary application identifiers. Moreover, the computer-readable medium can also include a fourth set of instructions configured to cause a computer to receive a data event request and a fifth set of instructions configured to cause a computer to respond to the data event request prior to receiving additional data event requests.

To the accomplishment of the foregoing and related ends, the one or more aspects comprise the features hereinafter fully described and particularly pointed out in the claims. The following description and the annexed drawings set forth in detail certain illustrative aspects of the one or more aspects. These aspects are indicative, however, of but a few of the various ways in which the principles of various aspects can be employed and the described aspects are intended to include all such aspects and their equivalents.

DETAILED DESCRIPTION

Figure 1:
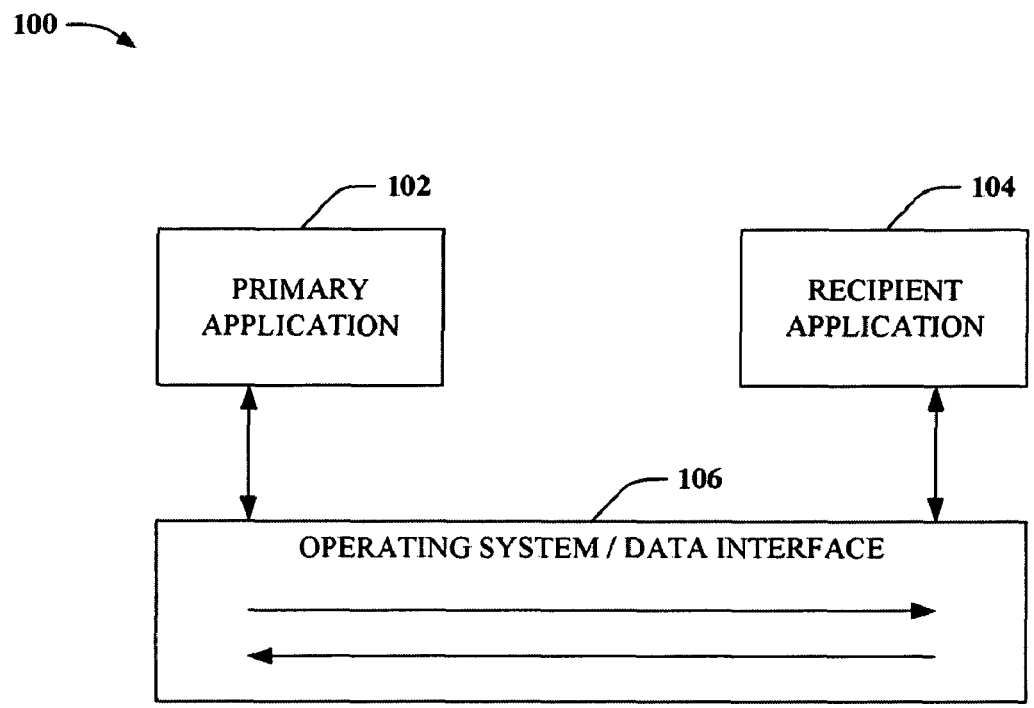
FIG. 1 illustrates a block diagram of a sample system that can provide secure, low power communication between mobile applications.

Various aspects are now described with reference to the drawings, wherein like reference numerals are used to refer to like elements throughout. In the following description, for purposes of explanation, numerous specific details are set forth in order to provide a thorough understanding of one or more aspects. It can be evident, however, that such aspect(s) can be practiced without these specific details. In other instances, well-known structures and devices are shown in block diagram form in order to facilitate describing one or more aspects.

The subject disclosure provides for secure efficient and computationally light communication between applications in a mobile environment. Various conventional mechanism for securing electronic communication exist, however, such conventional mechanisms typically utilize complex and computationally intensive encryption and decryption algorithms. Such mechanisms consume a relatively large amount of electrical power due to the computation requirements. Mobile operating environments, however, benefit from low power consumption due to reliance on battery power. Although some applications have been modified for the low power consumption in the mobile environment, such modifications have been lax in securing communications. One reason is due to advances and anticipated advances in system processing and memory technology. For instance, such advances have led many application researchers to avoid modifying communication protocols to reduce power consumption, in favor of anticipated advances in processor size, parallel processing, memory size, and the like.

Also disclosed is inter-application communication utilizing a round-trip concept. Specifically, applications can wait for a concurrent request or response to be completed prior to initiating and/or processing subsequent requests/responses. Round-trip communication can be particularly efficient in a synchronous environment. Common conventional communications, such as transmission control protocol/Internet protocol (TCP/IP), typically transmit a string of data packets prior to awaiting a response from a target application. In addition, in secured TCP/IP communications, decryption and/or understanding received data often depends on receiving all data packets in a transmission. If one data packet is lost, much of the transmitted data can be unusable. Instead, the subject disclosure provides for re-transmission of requests and/or responses if data or a security identifier is lost by an initiating or recipient application. Such a system is dramatically different from the widely successful TCIP/IP architecture utilized in the Internet and most private intranets as well as other message passing and/or shared memory environments. As a result, the round-trip and re-transmission architecture described herein is contrary and distinct from conventional communication architectures, which, because of their success and popularity, have led research away from efficient, synchronous and low power secure data exchange described herein.

In addition to the foregoing, disclosed is an inter-application communication architecture that employs random numbers, generated by particular applications, to identify and/or authenticate communication provided by another application. For instance, an initiating mobile application can generate a random number and provide that random number to a recipient application. Subsequent responses to the initiating mobile application should include the random number, or an increment thereof identifying a particular round-trip, to identify communication as coming from the recipient, and not a spoofing program or other malware. According to further aspects, the random number(s) can be encrypted utilizing a computationally un-intensive hash function (e.g., SHA-1, SHA-224, SHA-256, SHA-386, SHA-512, SHA-2, message digest algorithm 5 [MD5], or the like) to obfuscate the random numbers without requiring intensive and high power encryption/decryption algorithms. Additionally, the hashed random number(s) can be truncated as required by a particular communication interface between the initiating and recipient applications. Accordingly, disclosed is a mechanism to provide secure inter-application communication beneficial for a mobile environment.

Various aspects of the disclosure are described below. It should be apparent that the teaching herein can be embodied in a wide variety of forms and that any specific structure and/or function disclosed herein is merely representative. Based on the teachings herein one skilled in the art should appreciate that an aspect disclosed herein can be implemented independently of other aspects and that two or more of these aspects can be combined in various ways. For example, an apparatus can be implemented and/or a method practiced using any number of the aspects set forth herein. In addition, an apparatus can be implemented and/or a method practiced using other structure and/or functionality in addition to or other than one or more of the aspects set forth herein. As an example, many of the methods, devices, systems and apparatuses described herein are described in the context of one or more mobile applications operating on at least one mobile device and establishing secure communication between such applications. One skilled in the art should appreciate that similar techniques could apply to other communication environments as well.

As used in this disclosure, the terms "component," "system," and the like are intended to refer to a computer-related entity, either hardware, software, software in execution, firmware, middle ware, microcode, and/or any combination thereof. For example, a component can be, but is not limited to being, a process running on a processor, a processor, an object, an executable, a thread of execution, a program, and/or a computer. One or more components can reside within a process and/or thread of execution and a component can be localized on one computer and/or distributed between two or more computers. Further, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal). Additionally, components of systems described herein can be rearranged and/or complemented by additional components in order to facilitate achieving the various aspects, goals, advantages, etc., described with regard thereto, and are not limited to the precise configurations set forth in a given figure, as will be appreciated by one skilled in the art.

Additionally, the various illustrative logics, logical blocks, modules, and circuits described in connection with the embodiments disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any suitable combination thereof designed to perform the functions described herein. A general-purpose processor can be a microprocessor, but, in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. Additionally, at least one processor can comprise one or more modules operable to perform one or more of the steps and/or actions described herein.

Furthermore, various aspects are described herein in connection with a mobile communication device (or, e.g., a mobile device). A mobile communication device can also be called a system, a subscriber unit, a subscriber station, mobile station, mobile, mobile device, cellular device, multi-mode device, remote station, remote terminal, access terminal, user terminal, user agent, a user device, or user equipment, or the like. A subscriber station can be a cellular telephone, a cordless telephone, a Session Initiation Protocol (SIP) phone, a wireless local loop (WLL) station, a personal digital assistant (PDA), a handheld device having wireless connection capability, or other processing device connected to a wireless modem or similar mechanism facilitating wireless communication with a processing device.

Moreover, various aspects or features described herein can be implemented as a method, apparatus, or article of manufacture using standard programming and/or engineering techniques. Further, the steps and/or actions of a method or algorithm described in connection with the aspects disclosed herein can be embodied directly in hardware, in a software module executed by a processor, or in a combination of the two. Additionally, in some aspects, the steps and/or actions of a method or algorithm can reside as at least one or any combination or set of codes and/or instructions on a machine readable medium and/or computer readable medium, which can be incorporated into a computer program product. Further, the term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

In addition to the foregoing, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, in this example, X could employ A, or X could employ B, or X could employ both A and B, and thus the statement "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of a system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring to FIG. 1, a block diagram of an example system 100 is depicted that provides secure communication for one or more mobile applications in a mobile operating environment (106). System 100 can include a primary application 102 designated to initiate a handshake session with other applications (104). The primary application 102 can be any suitable application configured to operate on a mobile operating system (106). Examples of the primary application 102 can include diagnostic gathering applications (e.g., quality of service [QoS] applications), communication applications (e.g., e-mail, instant message [IM], short message service [SMS], voice call setup and/or maintenance, voice over Internet Protocol [VoIP] setup and/or maintenance, ring-tone downloading or playing applications, web browser applications, such as wireless application protocol [WAP], or the like), or combinations thereof or of the like. The mobile operating environment can be any suitable environment for storing and executing mobile applications and transferring data between such applications including, for instance, a binary runtime environment for wireless (BREW), described below, or the like.

Primary application 102 can initiate a handshake that establishes a secure communication session with at least one other application (104). Although much of the subject disclosure involves a single communication between two applications, the application (102) can maintain multiple secure communication sessions with multiple other applications (104) concurrently. The handshake can be utilized to create a trusted "channel" between the primary application 102 and a recipient application 104. As a result, arbitrary data (e.g., binary, etc.) can be exchanged between the primary application and the recipient application over the trusted channel utilizing, for instance, address pointers that identify data, instructions, and so on.

A handshake can be initiated by the primary application 102 by sending a handshake request that includes at least a unique identifier of the primary application 102 or a random number generated for the handshake, or both. The unique identifier is an application ID associated with the primary application, that can be utilized by a recipient application to verify that the primary application is to be trusted. Typically, an operating system (106) can require certain standards be met for applications designed to execute on the operating system (106). One such requirement can be to incorporate a list of unique identifiers of trusted primary applications. A recipient application 104 having such a list could then verify that a received handshake request is sent by an application authorized to make the request. The recipient (104) could then trust and engage in communication with such application.

In addition to a unique identifier of a primary application, a handshake request can also include a random number (e.g., 32 bit, 16 bit, 64 bit, and so on) generated for the handshake. The random number can be sent to an intended recipient application and incorporated into responses sent to the primary application 104 by the recipient application 104. As a result, a response that includes the random number (or, e.g., a predictable variation thereof, discussed below) can be identified as originating from the intended recipient. According to additional aspects, the random number can be hashed utilizing a particular hash function (e.g., SHA-1, SHA-2, or the like) and/or truncated for transmission over a particular communication interface (106). A hashed random number can be much more difficult to decrypt, providing significant protection from spoofing attacks. Truncation can be utilized to transmit the random number utilizing various protocols and/or communication interfaces (106) that support different size numbers. For instance, if a generated random number identifying a handshake session is 32-bit, and a communication interface with a recipient application (104) enables only 16-bit data transfer, the 32-bit random number can be hashed and then truncated to 16-bit for transmission. The recipient can then hash and/or truncate the random number and compare it to the received hashed and/or truncated number to verify whether a sender of communication is the initiator (102) of the handshake.

Recipient application 104 can receive a handshake request and verify whether a sender (102) is a trusted primary application. Particularly, a unique identifier can be extracted from the handshake request and compared with a list of trusted primary application identifiers. If the extracted identifier matches an identifier on the list, a handshake response can be sent to the sender (102), establishing a secure channel between sender (102) and recipient (104). If the extracted identifier does not match an identifier on the list, the handshake and any subsequent communication can be ignored until a verified handshake is received.

Additionally, the recipient application 104 can extract and store a random number included within the handshake request. As a specific example, the random number can be stored in temporary memory (not depicted) to make it more difficult for malicious programs to extract the random number and spoof the recipient application's (104) identity. Upon verifying the unique identifier included within the handshake request, discussed above, the recipient application 104 can send a handshake response that includes the random number. Particularly, by including the random number the recipient application 104 can identify itself to the primary application 102. According to particular aspects, the recipient application 104 can hash and/or truncate the random number to make spoofing the recipient application's (104) identity (e.g., to the primary application 102 that generated and therefore is configured to trust the random number) more difficult and/or make the hashed number more compatible with particular communication interfaces (106), as discussed above.

Furthermore, the recipient application 104 can also generate and include a second random number into the handshake response. The second random number can be utilized by the primary application 102 to identify itself in subsequent communication with the recipient application 104. Subsequent communication by the primary application 102 can hash and/or truncate the second random number, as discussed above, to protect integrity of the second random number.

According to further aspects, subsequent receiving a handshake response from the recipient application 104, primary application 102 can send a data event to the recipient application 104. The data event can, for instance, involve any data or data structure suitable to a mobile environment, incorporate a request for data, or a request to carry out an instruction (e.g., gathering diagnostic information, incorporate a configuration parameter, and so on), or a combination thereof or of the like. The request can include data within the request itself, or can utilize address pointers to identify data in shared memory, and so on. In addition to data/instructions, the data event can incorporate the second random number generated by the recipient application (e.g., where the second random number is hashed and/or truncated) to identify and/or certify that a sender of the data event is the primary application 102.

According to particular aspects, primary application 102 can refrain from sending additional data events (e.g., distinct from a concurrent data event), containing additional instructions, data requests, and so on, until a concurrent data event response is received. By waiting for a particular response, a concept of communication round-trip is created. The round-trip involves a two-way communication; for instance, a round-trip can require a request by the primary application as well as a response by the recipient, or vice versa. The round-trip concept also enables re-transmission of data that is not received in an anticipated period of time. For instance, communication delay over the data interface 106 between the primary application 102 and recipient application 104, measured with respect to the handshake request and the handshake response, can be utilized to establish an anticipated response timer. Upon sending a data request, handshake, or the like, an application (102, 104) can set an anticipated response timer that indicates an expected time of response to the transmission. If a response is not received within the expected time of response, optionally in conjunction with a threshold variation time (e.g., some fraction or multiple of the expected time of response), a recipient application 104 can be deemed non-responsive.

As a particular embodiment of the foregoing, a random number can be incremented for each round-trip communication. For example, if a primary application receives a handshake response that includes the second random number, a subsequent data event request (e.g., requesting diagnostic information) can increment the random number one time (e.g., identifying a first round-trip communication) and send the incremented random number (e.g., hashed and/or truncated) along with the data event request. The recipient application 104 can verify the sender of the data event by also incrementing the random number (and, e.g., hashing and truncating it as appropriate) and comparing the result to the random number included within the data event. Consequently, system 100 provides both for secure, round-trip communication as well as a mechanism to identify a round-trip. Alternatively, or in addition, if a random number comparison does not match, the received communication can be ignored. If a random number comparison does not match for a predetermined and/or configurable number of received communications (e.g., 3), subsequent requests/responses can be ignored until a handshake is re-initiated between the primary application 102 and recipient application 104, re-establishing a secure channel between the applications (102, 104).

If a response to a request is not received (e.g., within a response time or response time plus a threshold) an application (102, 104) can re-initiate a request. Due to the round-trip requirement, an application (102, 104) can assume that no other outstanding request exists at least in regard to a non-responsive application (102, 104). If a response is received to the re-initiated request, data can be processed and/or communication continued as suitable. If no response is still received, the application (102, 104) can re-initiate a predetermined and/or configurable number of requests (e.g., established by an expected or determined packet loss in the data interface 106 between the primary application 102 and recipient application 104), at least until a response to one of the requests is received. Further, if no response is received after the predetermined and/or configurable number of re-initiated requests, the application (102, 104) can stop sending the requests and simply wait for a response, or, if the application (102, 104) is the primary application 102, a handshake re-initiation can be sent to determine whether the recipient application 104 is still available. As a result, unlike many conventional data transfer mechanisms, a lost request and/or random number can be re-sent and/or re-requested without having to re-send additional data packets required to understand the lost packet (e.g., as exhibited with packet loss in secure TCP/IP environments). Accordingly, the subject disclosure provides for efficient re-transmission of data in a packet loss environment by allowing re-transmission of single requests of a response to such request is not received.

According to still other aspects, system 100 can provide for re-initiating of a handshake between applications executing on a mobile operating system (106). For example, if a configurable number of data event requests do not elicit responses primary application 102 can re-initiate a handshake. The handshake can include at least the unique identifier of the primary application 102 as well as the random number generated for the handshake session (or, e.g., a new random number to create a new handshake session). In such a manner, communication can be re-established if the recipient application 104 loses the random number generated by the primary application. According to particular embodiments, a handshake can be re-initiated a configurable and/or predetermined number of times. Such number of times can be based on determined and/or anticipated packet loss in the interface (106), likelihood of interference by malware, or a combination thereof or of the like.

In addition to the foregoing, primary application 102 can re-initiate a handshake if no data is received from the recipient application 104 within a threshold period of time. Alternatively, or in addition, a handshake can be re-initiated a default period of time after the handshake is first initiated, or integrals of the default period of time (e.g., 1 hour, 2 hours, 3 hours, and so on). According to still other aspects, a handshake can be re-initiated if a handshake "start" command is received from a user interface of a device (e.g., a user performs a diagnostic and/or user interface [UI] "help" function that initiates a handshake, and so on). Typically, re-initiation of a handshake can be limited to a configurable number of times. Thus, if 3 handshake re-initiations are sent without a response, for instance, the handshake can simply be terminated and/or not continued, subject to user-initiation of a handshake for example. Accordingly, inter-application communication can be re-established and/or continued even if random numbers provided for a session are lost, and so on.

It should be appreciated that system 100 can utilize any suitable mobile operating system and/or data interface 106 for communication between the applications (102, 104). According to one embodiment, a BREW operating system can comprise the operating system/data interface 106. More specifically, BREW denotes the Binary Runtime Environment for Wireless® (BREW) software developed by Qualcomm, Inc., of San Diego, Calif. Other runtime environments can be utilized that, for example, operate to control the execution of applications on wireless computing devices. Operating system/data interface 106 can include a class of software extensions that allow the resident version, or remotely accessible version, of a module to be processed by a processing engine (not depicted) of a device. These software class extensions can communicate with processing subsystems on such device and can enable both data reads and commands. For example, the software extension can send commands on behalf of the application(s) (102) that invokes it. The module can then forward the responses of the subsystems across data interface 106 to a recipient application (104). Each resident application (102, 104) or module on a wireless device can create an instance of the new software extension to communicate with the subsystems independent of the other applications (102, 104) or modules.

Figure 2:
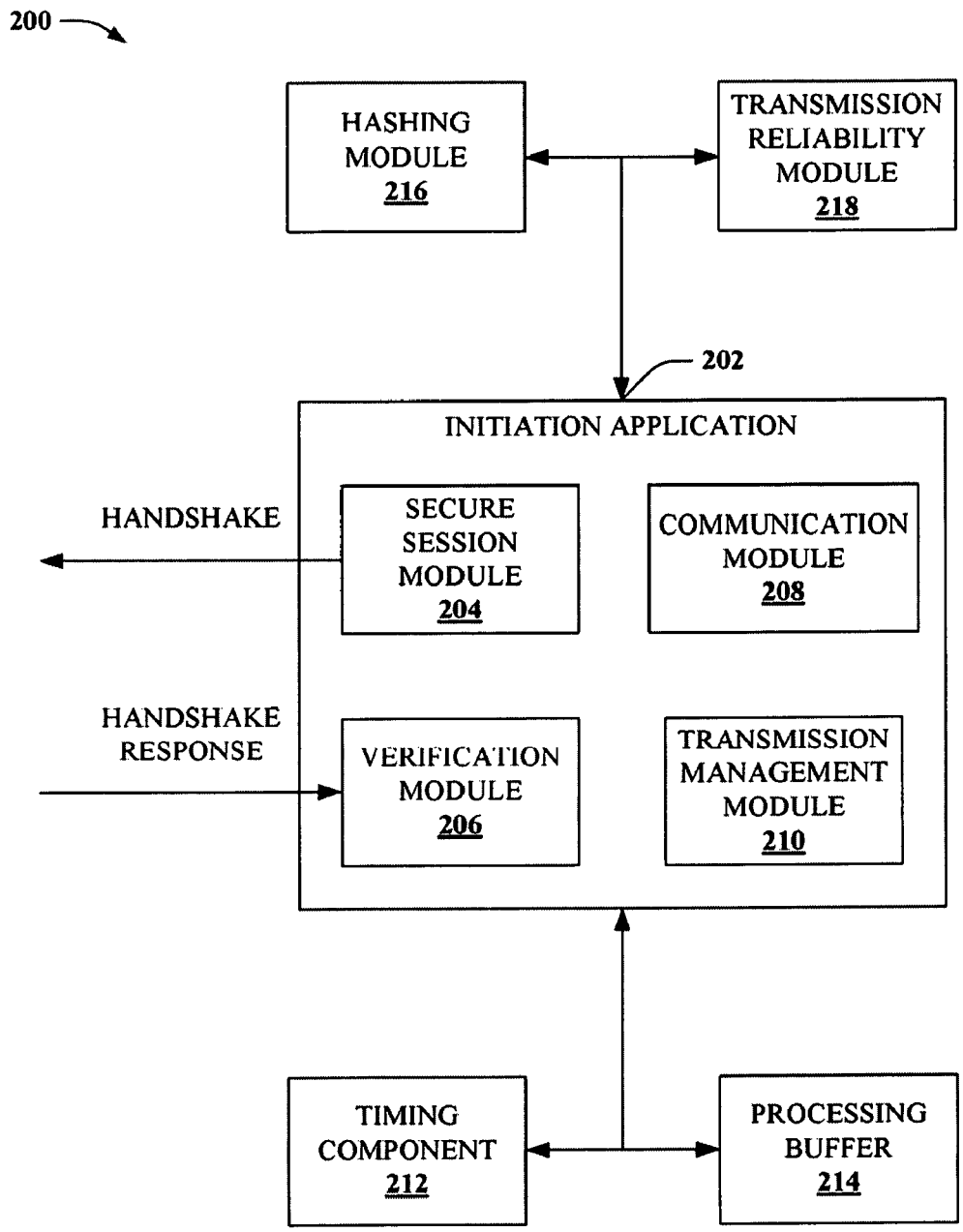
FIG. 2 depicts a block diagram of a sample system that can initiate secure communication between applications executed in a mobile operating environment.

FIG. 2 depicts a block diagram of a sample system 200 that can initiate secure communication between applications executed in a mobile operating environment. System 200 can include an initiation application 202 configured to establish a handshake session with one or more other recipient applications (e.g., see FIG. 3, infra). Initiation application 202 can utilize one or more hashed and/or truncated random number(s) to identify and/or certify a sender of a communication. In addition, initiation application 202 can communicate utilizing round-trip send and receive data events, enabling re-transmission for each event in case of lost data and/or lost identifiers. As a result, an efficient, low power and secure communication architecture is provided, in contrast to conventional architectures.

Initiation application 202 can include a secure session module 204 configured to at least initiate a handshake with a recipient application (not depicted), wherein the handshake includes a unique ID of the initiation application 202 and a random number. The random number can be utilized to identify subsequent communication initiated by the recipient application. As described herein, the random number can be hashed and/or truncated (e.g., by a hashing module 216 coupled with the initiation application 202) to make spoofing and like attacks more difficult for the secure communications. According to additional embodiments, the secure session module 204 can re-initiate the handshake if a handshake response is not received, or alternatively, if a number of data event requests are sent without receiving a data event response. Re-initiation of the handshake can facilitate re-establishment of a secure session, but re-providing a random number correlated to the session to the recipient application (e.g., if the recipient application lost the random number and could not verify and/or respond to received events as a result).

According to additional embodiments, the secure session module 204 can re-initiate the handshake in several circumstances. First, if no data is received from a recipient application within a threshold period of time. Such a handshake can be to refresh a communication and determine, for instance, is still coupled with the initiating application 202. Additionally, a handshake can be re-initiated if a refresh time expires (e.g., as discussed supra). Alternatively, or in addition, a handshake can be re-initiated if a command is received from a device user interface (e.g., if a user requests a handshake to be initiated).

According to still other embodiments, secure session module 202 can initiate a handshake termination. For instance, a handshake termination can occur if the random number received in a communication is not properly verified as the random number generated by the initiating application 202, or an increment thereof (e.g., indicating a potential unauthorized entity attempted to compromise the secure communication). Additionally, a handshake termination can be initiated if a handshake response is not received after a predetermined number of handshake requests are initiated. Such a result can indicate that the recipient application is not communicatively coupled with the initiating application, for example. As another example, a termination can be sent if the initiating application determines that a communication session is complete.

Also included within initiation application 202 is a verification module 206. The verification module 206 can be configured to receive a response to a handshake initiated by the secure session module 204. Such response can include a response number and a second random number. The verification module 206 can extract the response number and compare it to the random number in order to determine whether the communication was sent by the recipient application. Particularly, the verification module 206 can hash and/or truncate the random number, as suitable, and compare the result to the response number. If the results match, the response number can be verified as the random number.

In addition to the foregoing, initiation application 202 can also include a communication module 208 configured to send a data event request to a recipient application if the verification module 206 matches the response number with the random number (or, e.g., an appropriate increment of the random number identifying a particular round-trip session). Further, the communication module 208 can re-transmit the data event if a response to the data event is not received from the recipient application. According to specific aspects, the data event request can include an increment of the second random number. In addition, the increment can be correlated with a particular round-trip communication following the handshake and handshake response (e.g., a first increment for a first round-trip data event, second increment for a second round-trip data event, and so on). The increment can be used to further protect the communication from unauthorized parties. For instance, if an unauthorized program gains access to the random number or second random number, a data event containing such number will still be rejected by the initiating application 202 if a proper increment of the random number is not included with such a data event. Because the unauthorized program will be less likely to have monitored the communication since the handshake, it can be less likely to decipher a concurrent round-trip instance and gain trust of the initiation application 202.

Initiation application 202 can also include a transmission management module 210 configured to enable the communication module to send a second data event if a data event response from the recipient application that includes at least the increment of the second number is received. In other words, the management module 202 can prevent the communication module from sending additional data events until the data event response is received, in order to implement the round-trip communication policy discussed herein. Accordingly, lost random numbers and/or data event requests can be initiated by the initiation application 202 to facilitate reliable communication for a mobile operating environment.

According to additional aspects, system 200 can include a transmission reliability module 218 that can interface with the initiation application 202. The transmission reliability module 218 can be configured to determine a packet loss frequency and/or likelihood for a communication interface utilized by the initiation application 202 (e.g., operating environment/data interface 106 of FIG. 1, supra). The packet loss determination can be utilized by initiation application 202 to determine an appropriate number of data event re-transmission and/or handshake re-transmission events if a response is not received. Particularly, the application (202) can consider a likelihood of packet loss when determining appropriate re-transmission; if a packet loss is high, a relatively high number of re-transmissions can be established. If packet loss is low, a relatively low number of re-transmissions can be established.

In addition to the foregoing, system 200 can include a timing component 212 that is configured to compute an anticipated time between the primary and recipient applications. The anticipated time can be based at least in part on a time required to receive a response to the handshake initiated by the secure session module 204, for example. Further, if a response to a data event or subsequent handshake is not received within the anticipated response time (e.g., optionally modified by a threshold period, such as a fraction or multiple of the response time), the communication module 208 or secure session module 204 can re-transmit a data event or handshake, respectively.

According to still other aspects, system 200 can include a processing buffer that enables the initiation application 202 to buffer incoming responses and/or requests over a secure communication. As a result, operations concurrently performed by the application (202) need not be interrupted to process the response/request. Instead, data within the response/request can be copied into the processing buffer and addressed at a later period of time. Accordingly, synchronous processing can be conducted by system 200 despite receipt of concurrent processing requirements.

Figure 3:
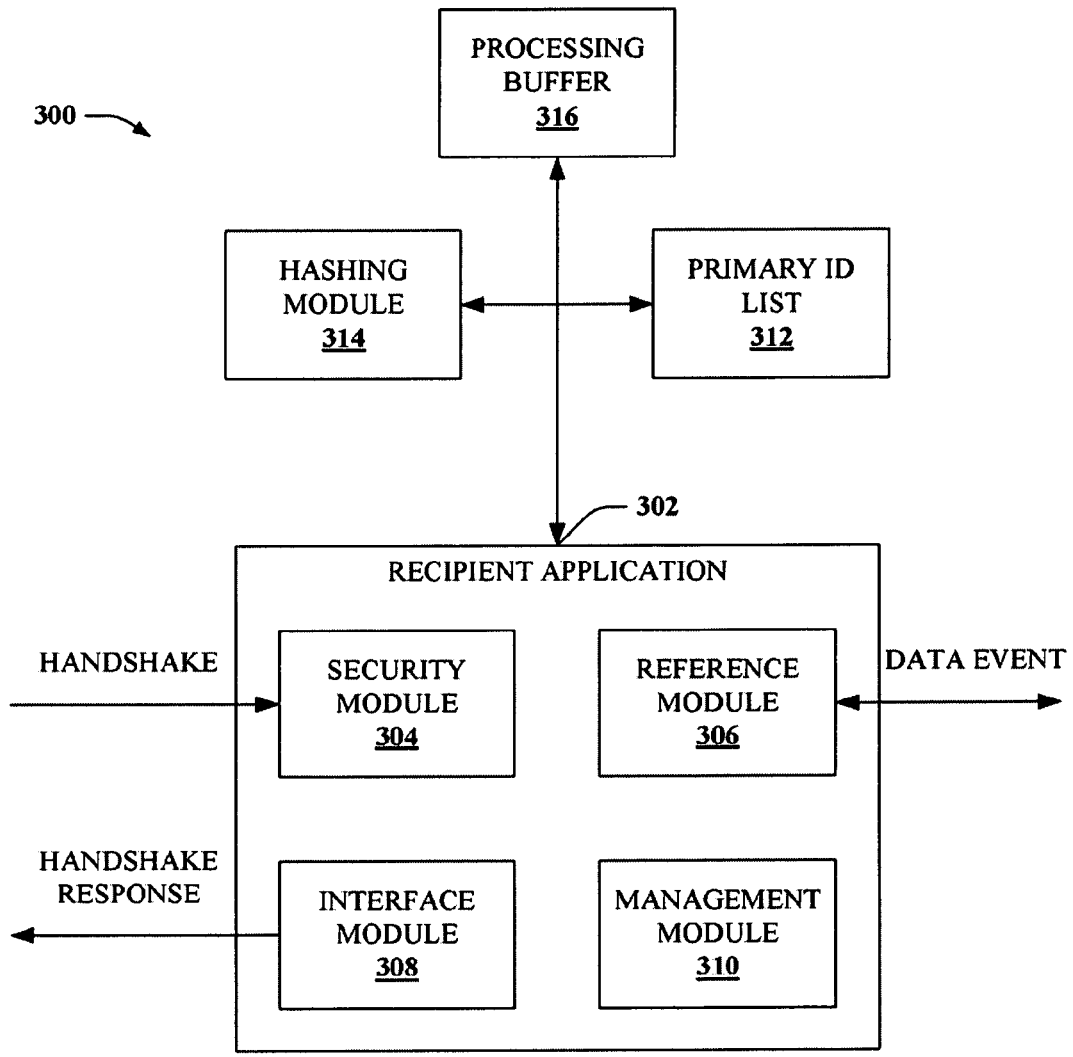
FIG. 3 depicts a block diagram of a sample system that can respond to secure communication between applications executed in a mobile operating environment.

FIG. 3 illustrates a block diagram of a sample system 300 that can respond to secure communication between applications executed in a mobile operating environment. System 300 includes a recipient application 302 that can receive at least a handshake request, extract and verify an ID of a sending application, and initiate a handshake response if the sending application is a trusted primary application. Accordingly, system 300 can engage in secure communication in a mobile operating environment.

Recipient application 302 can include at least a security module 304 configured to receive a handshake request from a primary application (not depicted, but see 202 at FIG. 2, supra). The handshake request can include a unique ID of the primary application and/or a random number generated by the primary application. Additionally, the recipient application 302 can include a reference module 306 configured to verify the unique ID of the primary application. For instance, the reference module can compare the unique ID to a list of trusted primary application identifiers 312. Such list (312) can include all unique IDs associated with applications that the recipient application 302 should trust and accept a handshake from. Thus, a primary application's unique ID can be verified by reference to the list 312.

Recipient application 302 also includes an interface module 308 configured to send a handshake response to a primary application if the unique ID is verified by the reference module 306, as discussed above. According to some embodiments, the handshake response can include the random number or a hashed and truncated version of such number (e.g., generated by hashing module 314 as described herein) and/or a second random number generated by recipient application 302 to identify communication responsive to a request and/or response sent by the recipient application 302. Furthermore, the interface module 308 can be configured to receive, respond to and initiate a data event request (e.g., requesting data, performance of an instruction, and so on). A data event request, for instance, can include at least an increment of the random number, the increment identifying a round-trip communication and the random number identifying communication pertaining to the handshake received by the security module 304. Likewise, a response pertaining to a data event request initiated by the interface module 308 (and, e.g., recipient application 302) can include at least the increment of the random number (e.g., included within the data event request) and/or the unique ID of a primary application. Alternatively, or in addition, the data event response can include data requested by the recipient application, or results of an instruction, or a combination thereof or of the like.

According to additional aspects, recipient application 302 can also include a management module 310 configured to require the interface module 308 to respond to a previously received data event request prior to receiving additional data event requests. Consequently, management module 310 can enforce round-trip communication policies between the recipient application 302 and a primary application, as described herein. Additionally, the management module 310 can permit the interface module 308 to respond to a data event request and include an increment of the second random number and/or an application ID of the recipient application 302 with such response. The response can identify an appropriate round-trip for an initiating application and further can provide information of the application (302) byway of the application ID. Alternatively, management module 310 can permit interface module 308 to send a data event request that includes an increment of the random number (e.g., to identify the communication originates from the recipient application and identify an appropriate round-trip of the communication) in conjunction with a request for data and/or instructions to be executed by the primary application.

According to one or more other aspects, management module 310 can facilitate buffering incoming instructions in order to avoid interruption of concurrent processes at recipient application 302. Specifically, the management module 310 can allocate a data buffer 316 appropriate for instructions contained in a data event request can copy data included within the data request to the data buffer 316. Additionally, the management module 310 can set a process timer that is based at least in part on an estimated time required to complete a current process. In addition to the foregoing, the management module 310 can also prevent the recipient application 302 from processing the data included within the data event until expiration of the process timer. Accordingly, the management module 310 can facilitate synchronous execution of instructions for the recipient application 302.

According to some embodiments, the management module 310 can instruct the interface module 308 to ignore one or more data event request. For instance, if a random number or increment thereof is not a match for an appropriate round-trip communication, integrity of the communication can be suspect. As a result, the management module 310 can require a new handshake, having a verifiable trusted unique ID, be initiated before any response is given to such communication.

According to additional embodiments, the management module 310 is further configured to receive a handshake re-initiation message that includes, for instance, a new random number and either the unique ID or a second unique ID. The management module 310 can store the new random number into a temporary buffer (316) until the unique ID/second unique ID is verified. If the ID is verified as a trusted application, the handshake can be approved, in which case the new random number can replace a previous random number sent by a primary application. If the ID cannot be verified, the handshake can be disapproved, and the new random number can be deleted from the temporary buffer (316). Accordingly, management module 310 can process a newly initiated handshake without losing verified parameters of a prior handshake.

According to further aspects, if no response to a data event request sent by the interface module 308 is received, the interface module 308 can re-send the request a configurable number of times (e.g., dependent upon determined packet loss, and so on). If no response is received after a predetermined number of re-sent requests, the management module can prevent the interface module 308 from sending further requests until a subsequent handshake is received (e.g., that includes a verifiable primary application class ID). Accordingly, management module 310 can also restrict processing resources spent on attempting to elicit a response from a non-responding primary application to facilitate more efficient yet reliable data exchange for applications in a mobile operating environment.

Figure 4:
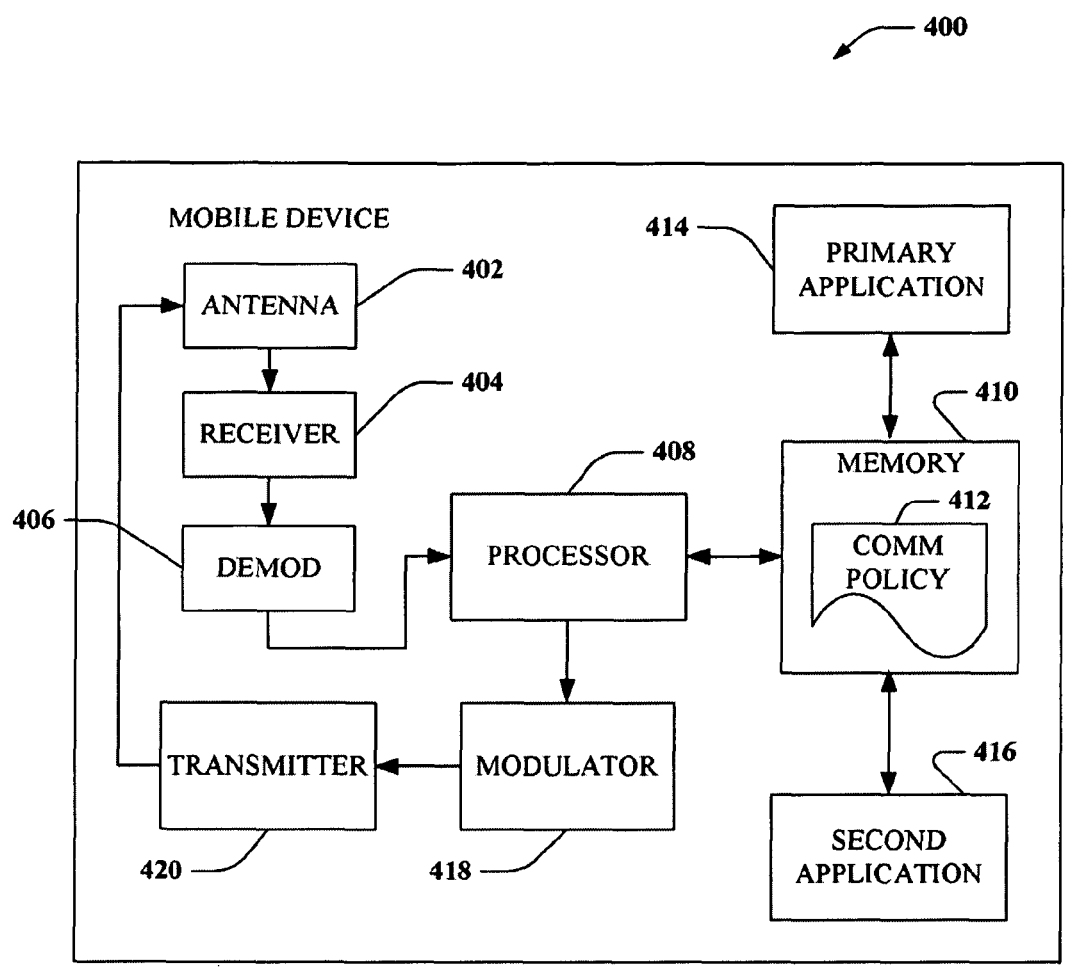
FIG. 4 illustrates an example mobile device that can execute mobile applications and provide secure and low power transmission between the applications.

FIG. 4 illustrates an example mobile device 400 that can execute mobile applications and provide secure and low power transmission between the applications. Particularly, mobile device 400 can provide a common platform (408, 410, 412) facilitating communication between mobile applications (414, 416), and/or can provide a platform for a first application (414, 416) to wirelessly interface with a remote device (not depicted, but see FIG. 5, infra) containing a second application (414, 416), where an intervening radio network, core mobile network and/or IP network, or the like, provides a communication interface between the remote devices (400, 504a, 504b). Accordingly, system 400 can provide secure communication between mobile applications coupled by a processing and communication architecture (e.g., processor 408, memory 410, communication policies 412, and suitable bus structure[s]) of a single device (400) or of remote, networked devices (400, 504a, 504b).

Mobile device 400 includes at least one antenna 402 (e.g., a transmission receiver or group of such receivers comprising an input interface) that receives a signal (e.g., pertaining to mobile application data transfer, a handshake, handshake response, data event, data event response, handshake termination, and so on) and a receiver 404, which performs typical actions (e.g., filters, amplifies, down-converts, etc.) on the received signal. Specifically, antenna 402 can receive a response to a handshake request, data event request, or the like as described herein (e.g., including a random number generated by at least one application executed at mobile device 400, random number generated by a corresponding application, response to a data event, etc.).

Antenna 402 and receiver 404 can also be coupled with a demodulator 406 that can demodulate received symbols and provide them to a processor 408 for evaluation. Processor 408 can analyze information received by antenna 902 or a user input interface of the mobile device (not depicted), and/or generate information for transmission by a transmitter 420. Additionally, processor 408 can control and/or reference one or more components (406, 412, 414, 416, 418) of the mobile device 400. Additionally, processor 408 can execute one or more modules, applications, or the like (412, 414, 416) that provide secure inter-application data transfer for mobile applications, as described herein.

Mobile device 400 can additionally include memory 410 that is operatively coupled to processor 408 and that can store data to be transmitted, received, and the like. Memory 410 can store information related to communication policies 412 for conducting secure communication between mobile applications (414, 416) resident on mobile device 400 and/or distributed across a remote interface (e.g., see FIG. 5, infra). Particularly, rules for generating, incrementing, hashing and/or truncating a random number(s) and transmitting such number(s) to target applications (414, 416) for identification and security purposes, as well as rules for conducting round-trip communication, re-sending un-acknowledged communication, initiating and re-initiating handshakes, or the like as described herein, can be included within the communication policies 412. Further, memory 410 can include a primary application 414, configured at least to initiate a handshake request (e.g., incorporating some or all modules depicted at FIG. 2, supra) with additional applications (416) and/or a second application 416 configured to receive handshake requests and verify whether the primary application 414 is a trusted application (e.g., incorporating some or all modules depicted at FIG. 3, supra), as described herein.

It will be appreciated that the data store (e.g., memory 1408) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1408 of the subject systems and methods is intended to comprise, without being limited to, these and any other suitable types of memory.

Mobile device 400 still further comprises a modulator 418, and a transmitter 420 that transmits generated signals (e.g., by processor 408 and modulator 418) to, for instance, a base station, an access point, another access terminal, a remote agent, etc. Although depicted as being separate from the processor 408, it is to be appreciated that primary application 414 and/or second application 416 can be part of processor 408 or a number of processors (not shown).

Figure 5:
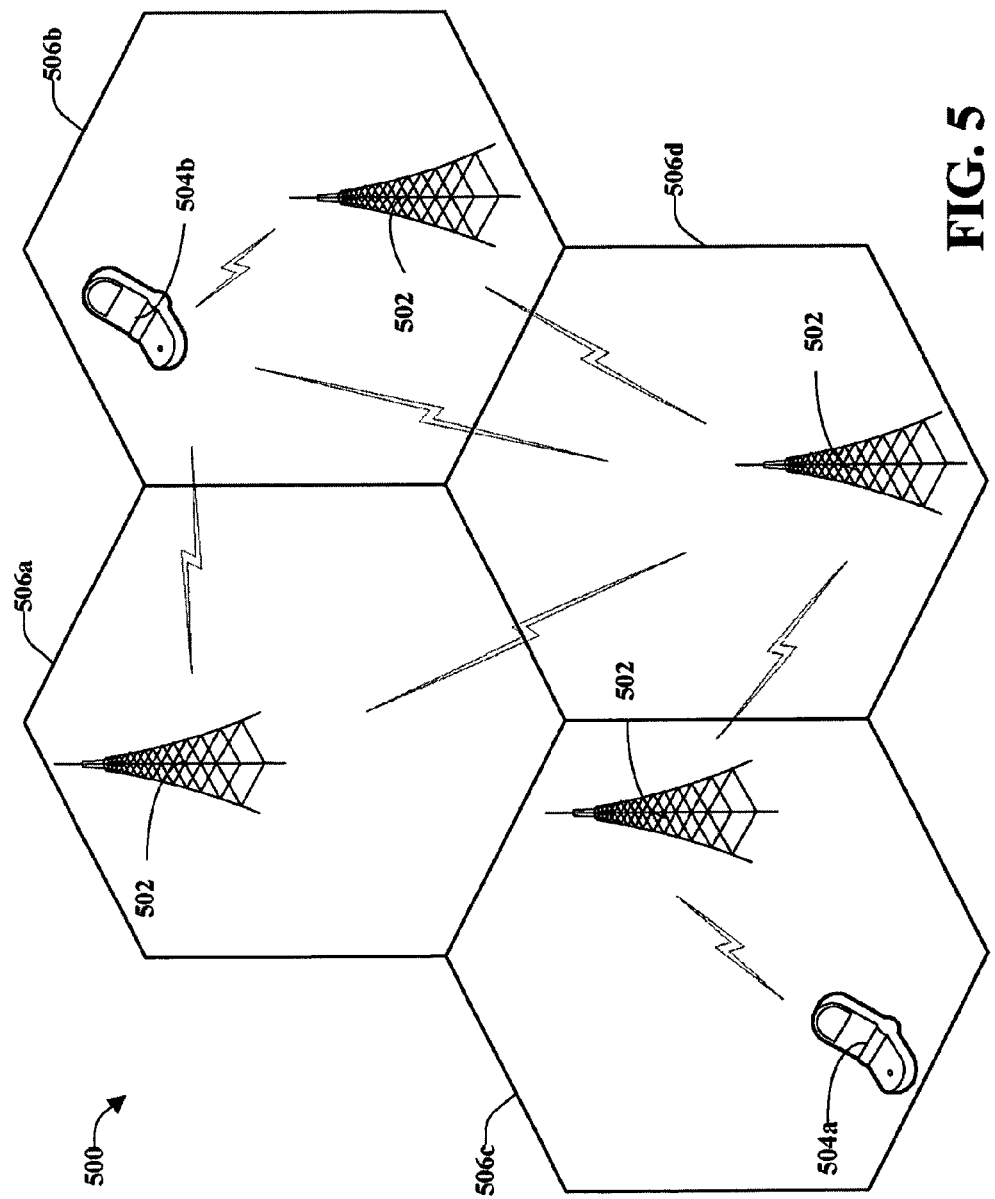
FIG. 5 depicts a sample network for providing secure communication for mobile applications operating on remote devices according to some aspects.
Figure 6:
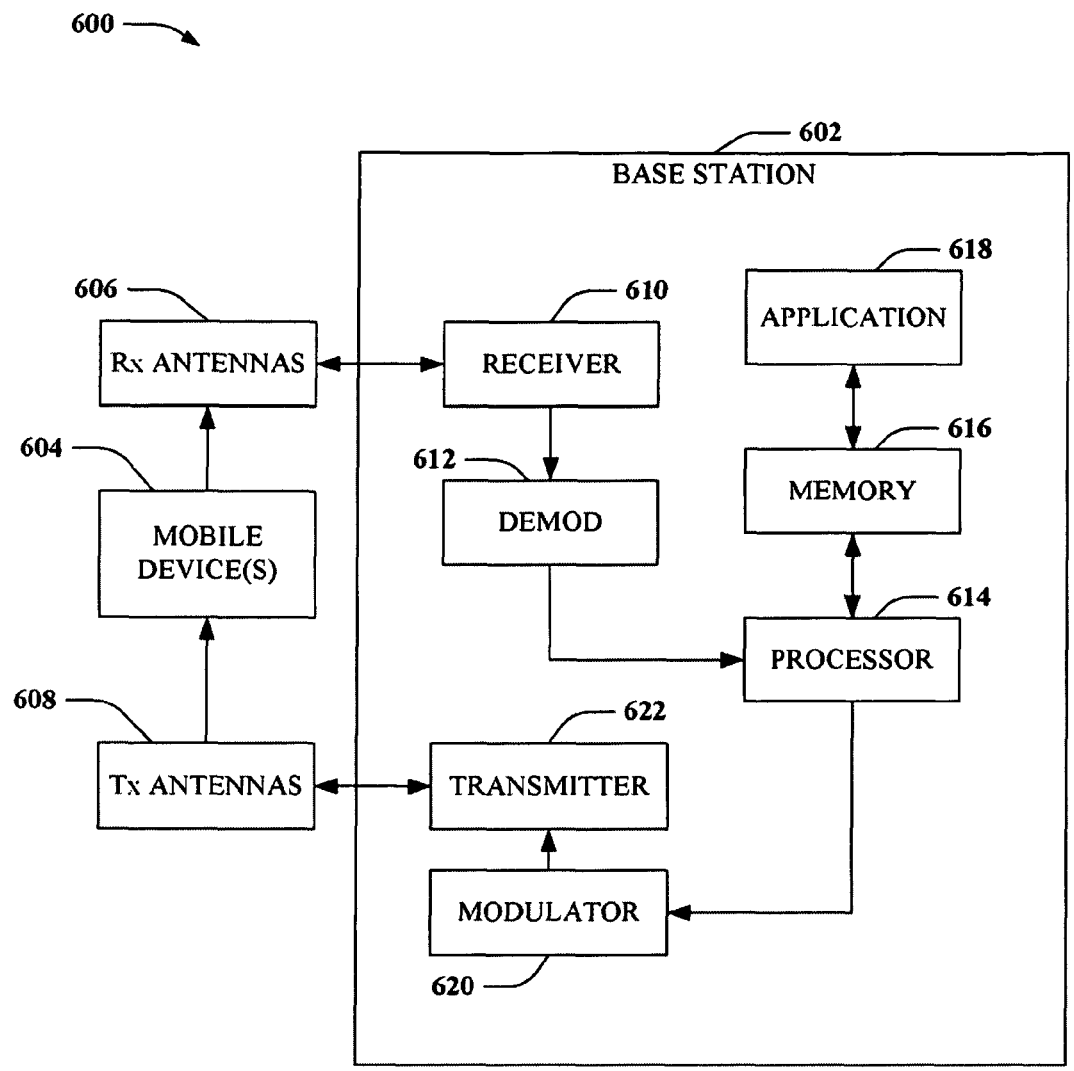
FIG. 6 illustrates an example base station for facilitating secure remote communication for mobile applications according to other aspects.

FIG. 5 depicts a sample network 500 for providing secure communication for mobile applications (not depicted, but see 414 and 416 of FIG. 4, supra) operating on remote devices (504a, 504b) according to some aspects. System 500 can comprise one or more base stations 502 in one or more sectors that receive, transmit, repeat, etc., wireless communication signals to each other and/or to one or more mobile devices (504a, 504b). As illustrated, each base station 502 can provide communication coverage for a particular geographic area, illustrated as three geographic areas, labeled 506a, 506b, 506c and 506d. Each base station 502 can comprise a transmitter chain and a receiver chain, each of which can in turn comprise a plurality of components associated with signal transmission and reception (e.g., processors, modulators, multiplexers, demodulators, demultiplexers, antennas, and so forth, as depicted at FIG. 6, infra), as will be appreciated by one skilled in the art. Mobile devices 504 may be, for example, cellular phones, smart phones, laptops, handheld communication devices, handheld computing devices, satellite radios, global positioning systems, PDAs, and/or any other suitable device for communicating over wireless network 500. System 500 can be employed in conjunction with various aspects described herein in order to facilitate secure communication between mobile applications operating on remote devices (e.g., mobile device 504a, 504b, or operating components of the network 500, such as depicted at FIG. 6, infra).

According to one or more specific aspects, base stations 502 are generally fixed stations that communicate with mobile devices 504a, 504b and can be called access points, Node Bs, or some other terminology. Mobile devices 504a, 504b are typically dispersed throughout the system 500, and each (504a, 504b) can be a fixed, mobile or semi-mobile (e.g., laptop) device. A mobile device can communicate with zero, one, or multiple base stations 502 on a downlink (e.g., data transmitted from a base station 502 to the device 504a, 504b) and uplink (e.g., data transmitted from the mobile device 504a, 504b to a base station 502) at any given moment. For a centralized architecture, a system controller (e.g., radio network controller [RNC], or the like, not depicted) can couple to base stations 502 and provide coordination and control for communication, protocols, diagnostic gathering, or like operations associated with base stations 502. For a distributed architecture, base stations 502 can inter-communicate as needed.

FIG. 6 illustrates an example system 600 including a base station 602 that can facilitate and/or participate in secure remote communication for mobile applications according to other aspects. System 600 comprises a base station 602 (e.g., access point, . . . ) with a receiver 610 that receives signal(s) from one or more mobile devices 604 through a plurality of receive antennas 606, and a transmitter 622 that transmits to the one or more mobile devices 604 through a transmit antenna 608. Receiver 610 can receive information from receive antennas 606 and can further comprise a signal recipient (not shown) that receives feedback data related to an un-received or indecipherable data packet. Additionally, receiver 610 is operatively associated with a demodulator 612 that demodulates received information. A processor 614 can analyze demodulated symbols provided by demodulator 612. The processor 614 further couples to a memory 616 that can store an application 618 that facilitates and/or participates in secure remote communication as described herein.

For instance, application 618 can be a primary application configured to initiate a handshake and send data event requests (e.g., related to diagnostic information, data analysis, and so on) to a recipient application operating on a mobile device 604 (e.g., application 618 can incorporate some or all of the modules depicted at FIG. 2, supra, in conjunction with initiating a secure mobile application handshake and participating in secure communication). Alternatively, application 618 can be a secondary application that can receive a handshake request and authenticate an initiating primary application as described herein (e.g., application 618 can incorporate some or all modules depicted at FIG. 3, supra, in conjunction with receiving and responding to a handshake and participating in secure communication). Application 618 can further include rules for generating and/or verifying random numbers that identify the application 618 to a corresponding application on the mobile device 604 or vice versa, or an increment of such random number(s) identifying a particular round-trip communication. Further, the rules can specify policies for re-transmitting un-acknowledged transmissions, re-initiating handshake requests and/or responses, and terminating a handshake, as described herein. Consequently, application 618 can engage in secure mobile communication with one or more applications resident upon mobile devices 604, and/or any other suitable activity related to performing the various actions and functions set forth herein.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Referring to FIGS. 7-12, methodologies relating to providing secure communication for applications operating at least in part in a mobile operating environment are depicted. While, for purposes of simplicity of explanation, the methodologies are shown and described as a series of acts, it is to be understood and appreciated that the methodologies are not limited by the order of acts. For example, in accordance with one or more aspects, some acts can occur in different orders and/or concurrently with other acts from that shown and described herein. In addition, those skilled in the art will understand and appreciate that a methodology could alternatively be represented as a series of interrelated states or events, such as in a state diagram. Moreover, not all illustrated acts are necessarily required to implement a methodology in accordance with one or more aspects.

Figure 7:
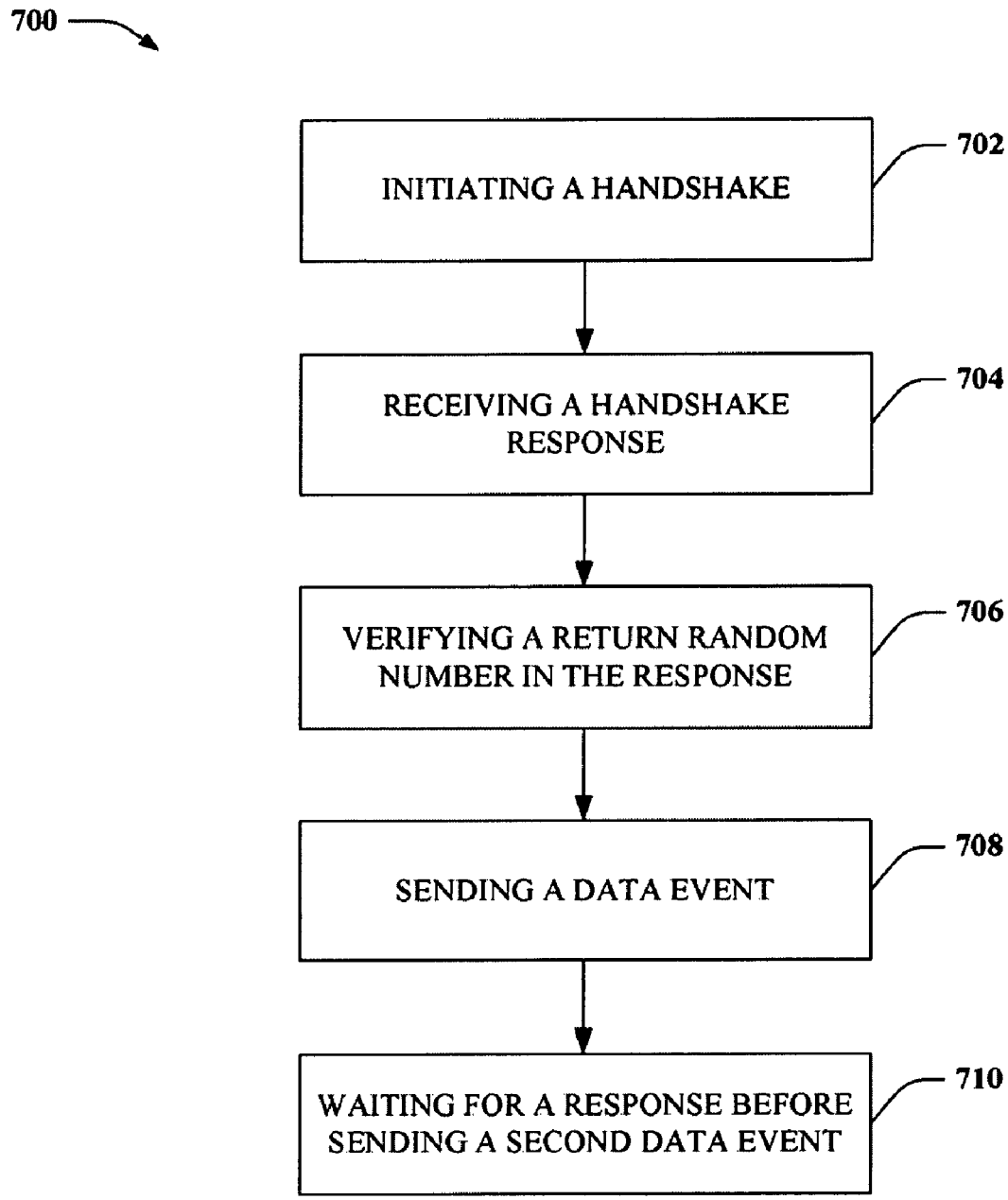
FIG. 7 depicts an example methodology for initiating secure communication between mobile applications in a mobile operating environment.

Referring to FIG. 7, an example methodology 700 is depicted for initiating secure communication between mobile applications in a mobile operating environment. Method 700, at 702, can initiate a handshake with a mobile application that includes a unique identifier of a primary mobile application and a random number generated for the handshake. The primary application can be configured to communicate via a mobile operating system (e.g., BREW operating or the like) with the mobile application, utilizing a message passing architecture, or shared memory, or a suitable combination thereof or of like data transfer platforms. The unique identifier specified in the handshake can be utilized to identify the primary application as a trusted application. The random number, on the other hand, can be utilized by the mobile application to identify itself to the primary application. Consequently, communication received at the primary application that contains the random number (and/or, e.g., an appropriate increment thereof) can be associated with the mobile application. As a corollary to the foregoing, if a communication received at the primary application does not include the random number (and/or, e.g., an appropriate increment thereof), the communication can be assumed un-associated with the handshake and therefore not secure.

At 704, method 700 can receive a handshake response. In particular, the handshake response can include a first number and a second random number generated by the mobile application. As a specific example, the primary application can include the second random number (and/or, e.g., an appropriate increment thereof) in a data event transmitted to the mobile application. The second random number can identify/certify the primary application as the trusted application that initiated the secure handshake session with the mobile application.

At 706, method 700 can verify whether the first number received with the handshake response at reference number 704 is the random number or an appropriate increment thereof. For instance, the first number can be compared with the random number to see if they are equivalent. Alternatively, if the first number is a hash (e.g., SHA-1, SHA-2, and so on) and/or truncation (e.g., 32-bit to 16-bit, or the like) of the random number, the random number can be hashed, truncated, and compared with the first number. If the first number and random number (or, e.g., a hash and/or truncation thereof) match, the primary application can authenticate the handshake response as originating from the mobile application, and can store the second random number for subsequent data event requests associated with the handshake. If the first number and random number do not match, the second random number can be discarded.

At 708, method 700 can send a date event to the mobile application. The data event can include the second random number or an increment thereof (e.g., to identify the primary application with the mobile application and/or a particular round-trip communication of the handshake session) to identify/certify the primary application. Further, the data event can include a block of data (and, e.g., an address pointer identifying a size of the block of data, an address pointer identifying a location of the block of data in shared memory, and so on) that can request additional data from the mobile application, request an instruction(s) be performed and result provided in response, or the like. Accordingly, the secure communication described by method 700 can be utilized to obtain data and/or control/configure other applications in a secure environment.

At 710, a second data event associated with the handshake session, initiated at reference number 702 and associated with the random number and/or its increments, can be delayed until a response to the data event is received. Accordingly, method 700 can implement round-trip communication between one or more mobile applications. Specifically, round-trip communication(s) can include one or more initiated events and received responses to such events, wherein each event/response pair is according an incremented random number identifying the round-trip communication(s). Consequently, synchronous communication can be provided involving relatively low power consumption (e.g., utilizing a hash function for encryption as opposed to mathematically intensive encryption/decryption schemes) for a mobile operating environment.

Figure 8:
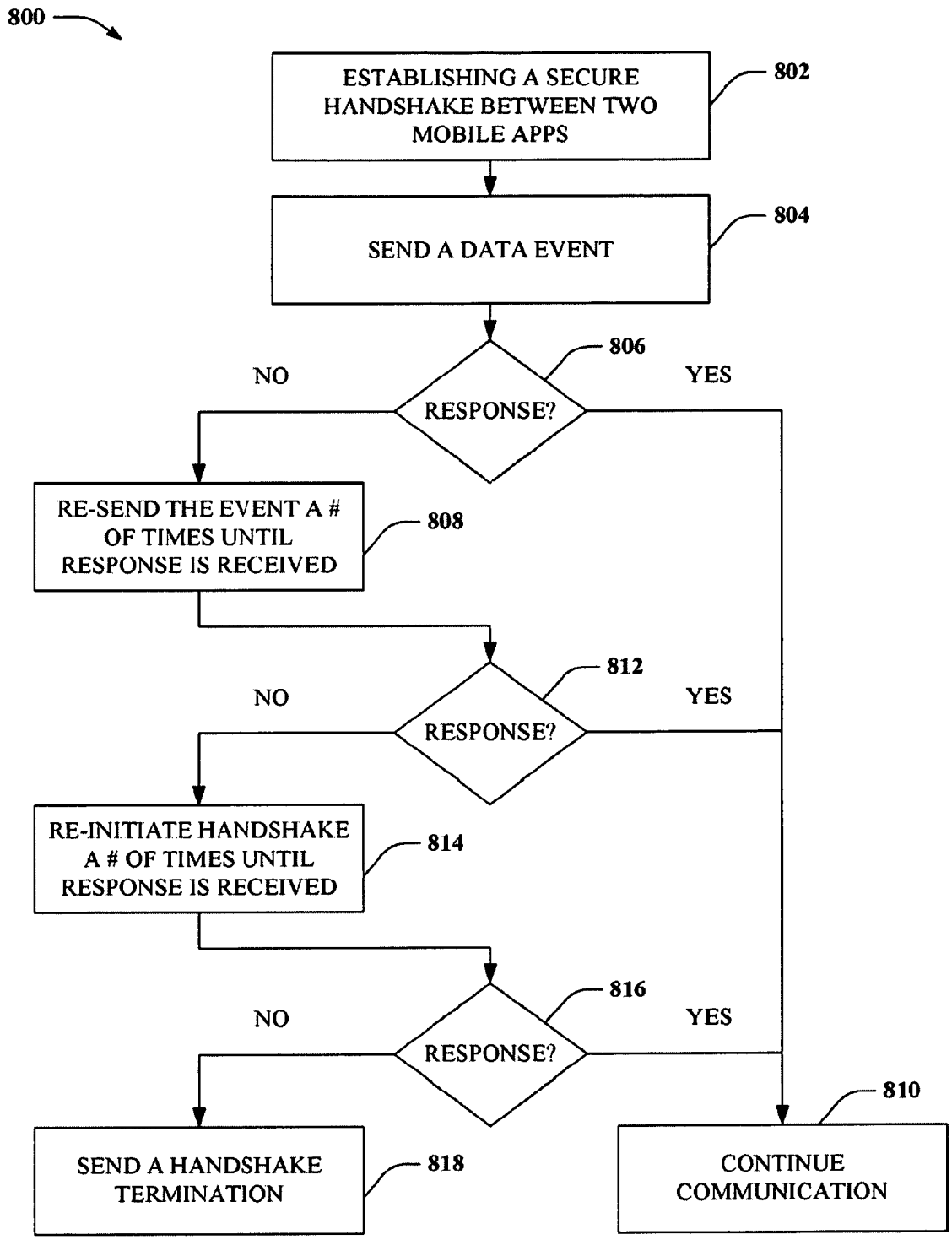
FIG. 8 illustrates a sample methodology for re-sending data events to complete round-trip communication according to one aspect.

FIG. 8 illustrates a sample methodology 800 for re-sending data events to complete round-trip communication according to one aspect. Method 800, at 802, can establish a secure communication handshake between two applications, at least one of which is a mobile application. The handshake and a response thereof can include at least one generated random number to identify an initiator of subsequent data requests. Further, the random numbers can be encoded utilizing hash functions and/or truncations thereof in order to conserve mobile processing power. Accordingly, method 800 can provide efficient and secure inter-application data transfer.

According to additional aspects, method 800 can also improve transmission reliability between such applications. For instance, at 804, method 800 can send a data event. The data event can include a random number (or, e.g., an appropriate increment thereof) identifying an initiating mobile application to a recipient mobile application. Further, the data event can include an operation (e.g., data transfer, diagnostic operation, analysis, etc.) request for the recipient application. At 806, a determination is made as to whether a response to the data event is received. Specifically, the determination can employ a response timer based at least in part on a determined and/or anticipated round-trip response time (e.g., measured during the handshake session) between the applications, and optionally including an additional fraction and/or multiplier of such response time. As a particular example, if the response is not received prior to expiration of a particular response timer, method 800 can proceed to reference number 808. If the response to the data event is received prior to expiration of the response timer, method 800 can proceed to 810 where the handshake communication is continued.

At reference number 808, method 800 can re-send the data event a configurable number of times (e.g., related to a determined and/or anticipated likelihood of data packet loss between applications) at least until a data event response is received. At 812, method 800 can make another determination as to whether a data event response is received as a result of the (configurable) number of re-sent requests. If the data event response is received, method 800 can proceed to 810 where communication is continued. If an appropriate response is not received, method 800 can proceed to reference number 814.

At 814, method 800 can re-initiate a handshake a configurable number of times, at least until a handshake response is received. As an example, if a recipient application lost a random number (or, e.g., memory storing the random number became corrupted) identifying a handshake session, the recipient application may be unable to authenticate the data events transmitted at reference numbers 804 and 808. Accordingly, as described herein, the recipient application could ignore such requests. By initiating a handshake at reference number 814, the random number or a new random number, along with a unique identifier of a primary application, can be re-submitted to the recipient application. As a result, a handshake can be refreshed or begun anew, respectively.

At reference number 816, method 800 can determine whether a response to the handshake is received. If so, method 800 can proceed to 810 where communication is continued (e.g., the data event or a subsequent data event is retransmitted/transmitted). If not, method 800 can proceed to 818 where a handshake termination can be sent. At 818, it can be assumed that a recipient application is no longer communicatively coupled with the sending application, or the recipient has become compromised by a malicious program, or communication policies corrupted, and so on. The handshake termination can include erasing all data associated with the handshake, such as random numbers, IDs of the primary and/or recipient applications, data involved in the communication, and the like. As described, method 800 can provide for reliable synchronous communication by re-sending lost/un-authenticated data requests prior to initiating further data requests. Consequently, errors in transmission can be corrected immediately, and redundant re-transmission (e.g., as exhibited in secure TCPIP communication) can be avoided.

Figure 9:
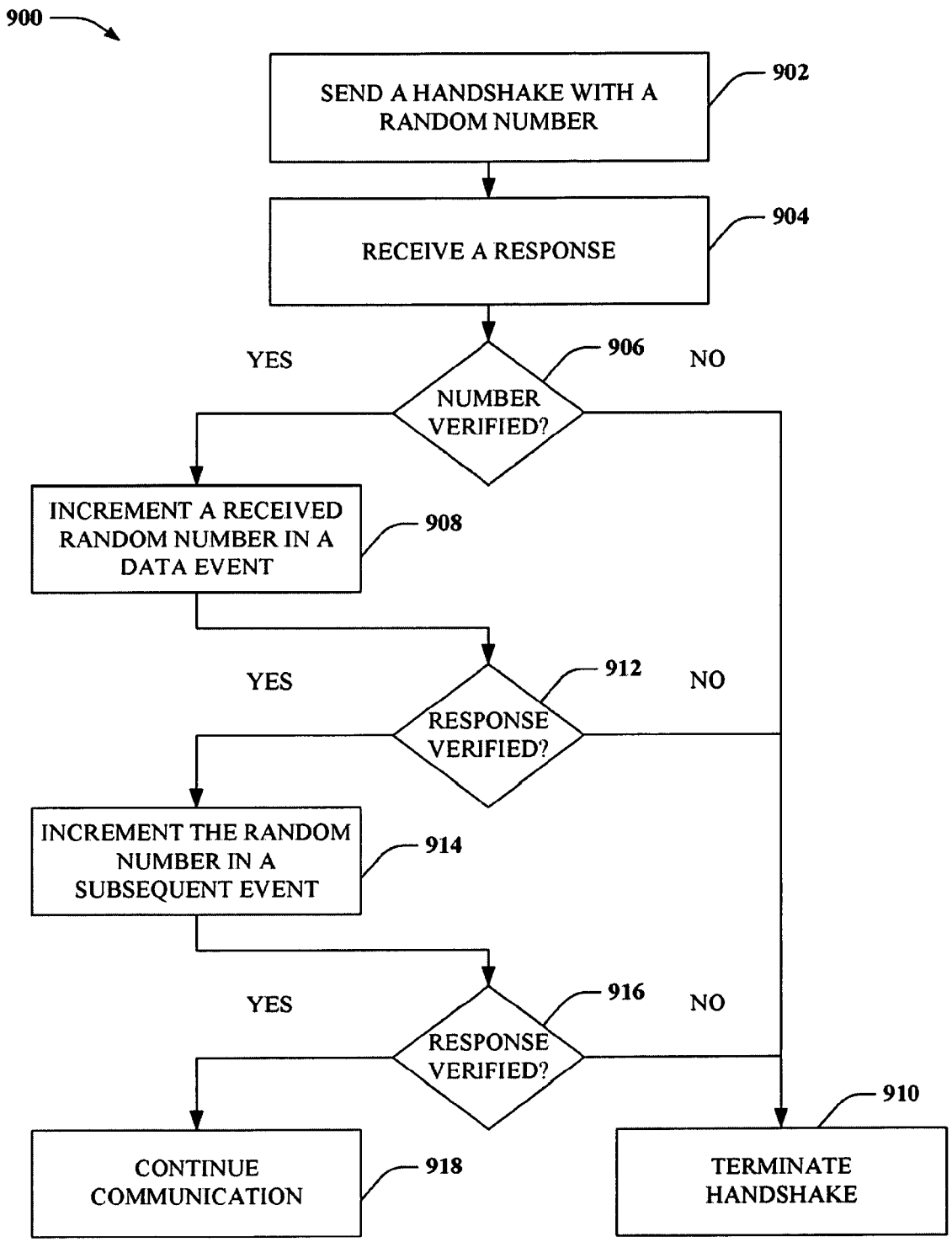
FIG. 9 depicts an example methodology for incrementing round-trip communication in a secure communication between mobile applications.

FIG. 9 depicts an example methodology 900 for incrementing round-trip communication in a secure communication between mobile applications. At 902, method 900 can send a handshake initiation including at least a random number. The random number can be utilized by a recipient application to securely identify communication as originating from such recipient (e.g., because the random number was sent only to the recipient application). The handshake can further include a unique ID of an initiating application, as described herein.

At 904, a response to the handshake can be received. At 906, a determination can be made as to whether the response includes the random number or an appropriate version thereof (e.g., a hashed and/or truncated version). If not, method 900 can proceed to 910 where a handshake termination is sent, and optionally all data related to the handshake session, including the random number, received numbers, data transmitted, and so on, can be deleted. If an appropriate number is included within the response received at reference number 904, method 900 can proceed to 908 where the received random number can be incremented and incorporated within a data event sent to the recipient application. The incremented random number can identify a concurrent round-trip communication session, as described herein.

At 912, a determination is made as to whether a response to the data event, if received, includes an appropriate increment of the random number. If not, method 900 proceeds to 910 where a handshake termination can be initiated. Particularly, it can be assumed that if an improper increment is received, the data event response was sent by an unauthorized application (e.g., the random number was compromised) or the secure communication policies of the recipient application have become corrupt, or the like. If, at reference number 912, an appropriate increment to the random number is received, method 900 can proceed to 914 where an additional increment to the random number is included within a subsequent data event. At 916, another determination can be made as to whether a response to the subsequent data event, if received, includes an appropriate additional increment of the random number. If so, method 900 can proceed to 918 where communication is continued in the fashion described by method 900 and/or as described elsewhere herein. If an appropriate increment is not determined at 916, method 900 can proceed to 910 where a handshake termination, described above, can be initiated. As described, method 900 can provide round-by-round analysis of incremented random numbers identifying a handshake session as well as an appropriate data event round-trip to secure communication between mobile applications.

Figure 10:
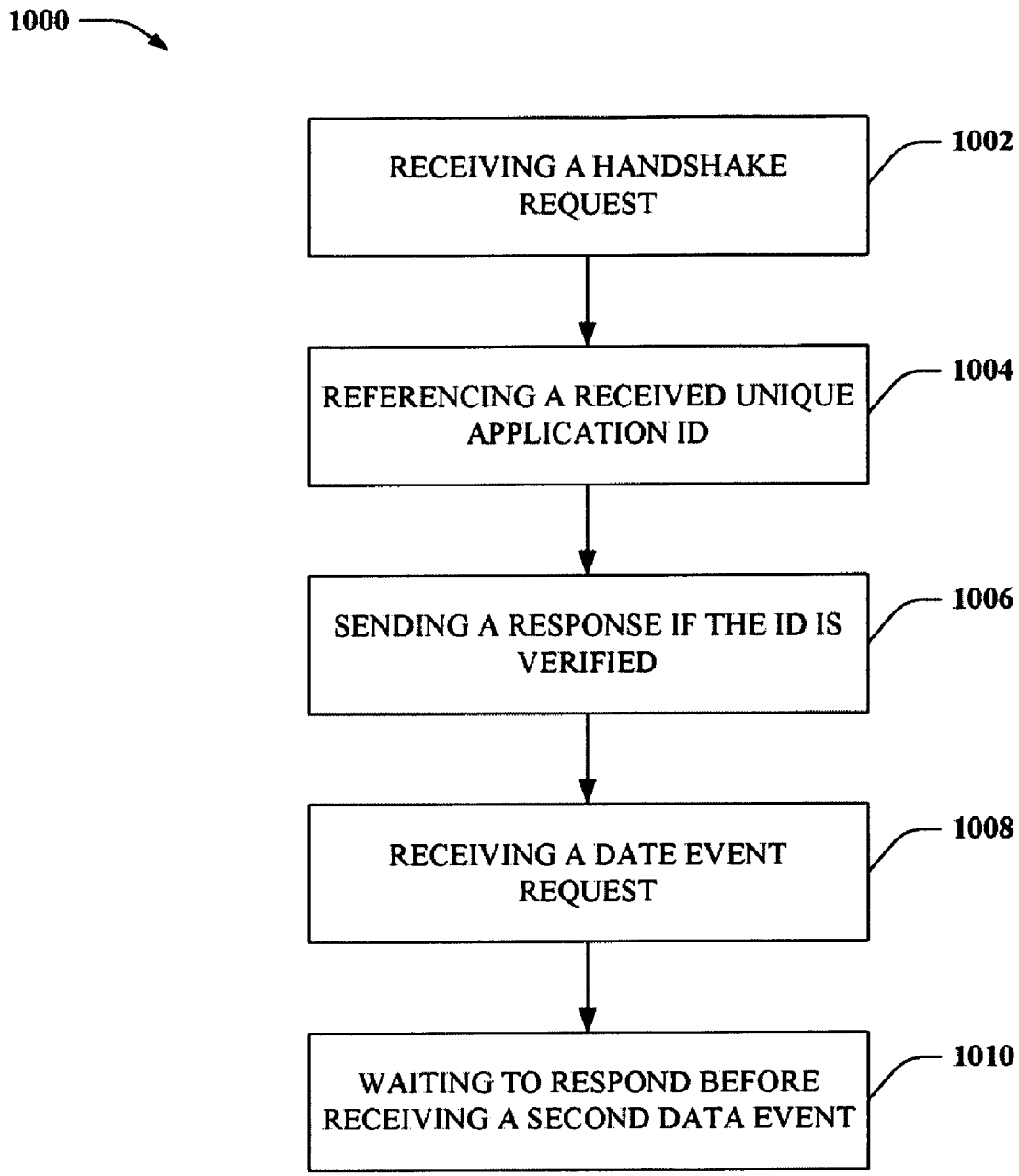
FIG. 10 illustrates a sample methodology for responding to secure communication between mobile applications in a mobile operating environment.

FIG. 10 illustrates a sample methodology 1000 for responding to secure communication between mobile applications in a mobile operating environment. At 1002, a handshake request can be received. The handshake request can include a unique identifier of an initiating application and/or a random number identifying the handshake, as described herein. At 1004, the unique identifier, if received, can be referenced against a list of trusted primary application IDs. If a match between a received unique identifier is found, method 900 can proceed to 1006. If not, method 900 can terminate (not depicted). At 1006, a response to the handshake can be sent if the unique ID is verified against the list of trusted applications. At 1008, a data event request can be received. The data event request can include, for instance, a second random number included within the handshake response to identify subsequent incoming communication associated with the handshake session (e.g., where such session is established by the handshake request received at reference number 1002 and handshake response sent at reference number 1006). At 1010, receipt of an additional data event request can be delayed at least until the data event request is responded to (e.g., a response to the data event request is sent prior to receiving additional data event requests). Accordingly, method 1000 can impose round-trip communication policies for secure communication, incorporating random numbers generated by initiating and recipient applications. Additionally, such random numbers can be hashed and truncated to provide additional security with low processing requirements and power cost. Therefore, method 1000 provides a mechanism to respond and participate to secure inter-application communication particularly beneficial for a mobile operating environment.

Figure 11:
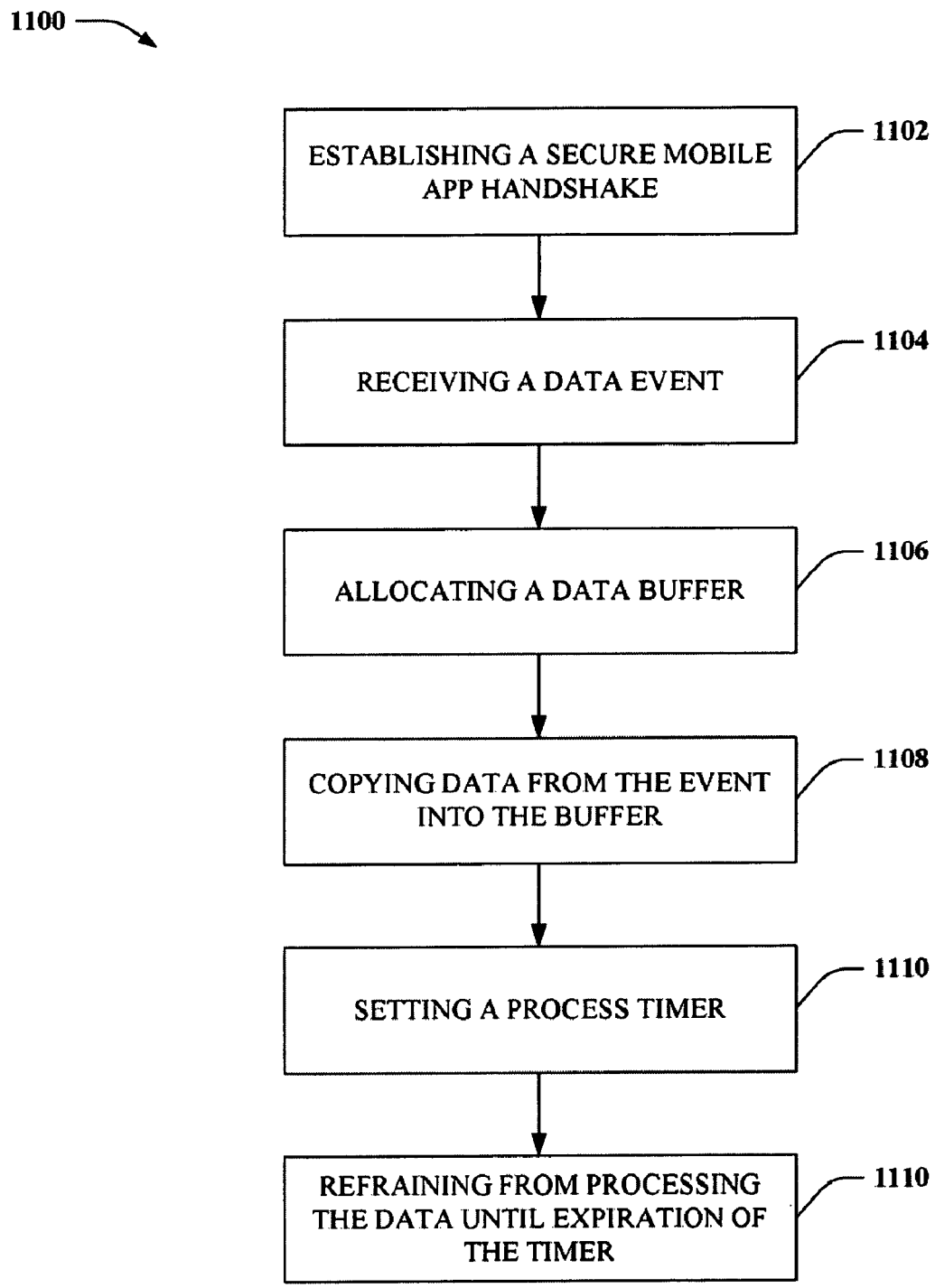
FIG. 11 depicts an example methodology for buffering subsequent requests until an initial request and round-trip communication are complete.

FIG. 11 depicts an example methodology 1100 for buffering subsequent data event requests until an initial request and round-trip communication are complete for secure inter-application data transfer. At 1102, a secure mobile application handshake can be established as described herein. At 1104, a data event request can be received. Further, at 1106, a data buffer can be allocated for storing data included within and/or specified by the data event request. For instance, such request can include instructions, configuration parameters, data to be analyzed, mobile communication diagnostics (e.g., QoS functions) to be performed, and so on. At 1108, data included within the data event request received at reference number 1104 can be copied into the data buffer allocated at reference number 1106. At 1110, a process timer can be set. For example, the process timer can indicate an expected time of completion for any concurrent processing being performed at a recipient application. The process time can enable delay of processing data received in the data event request until concurrent processes are complete. At 1112, method 1100 can refrain from processing (and, e.g., receiving, where reception includes processing) the data received within the data event request at least until expiration of the process timer. Accordingly, prior instructions received by the application can be completed and responded to before a current instruction is processed (e.g., received, where reception includes processing). Method 1100 provides a mechanism to facilitate round-trip communication in a synchronous environment, by buffering subsequent instructions, requests, etc., until prior processes can be complete.

Figure 12:
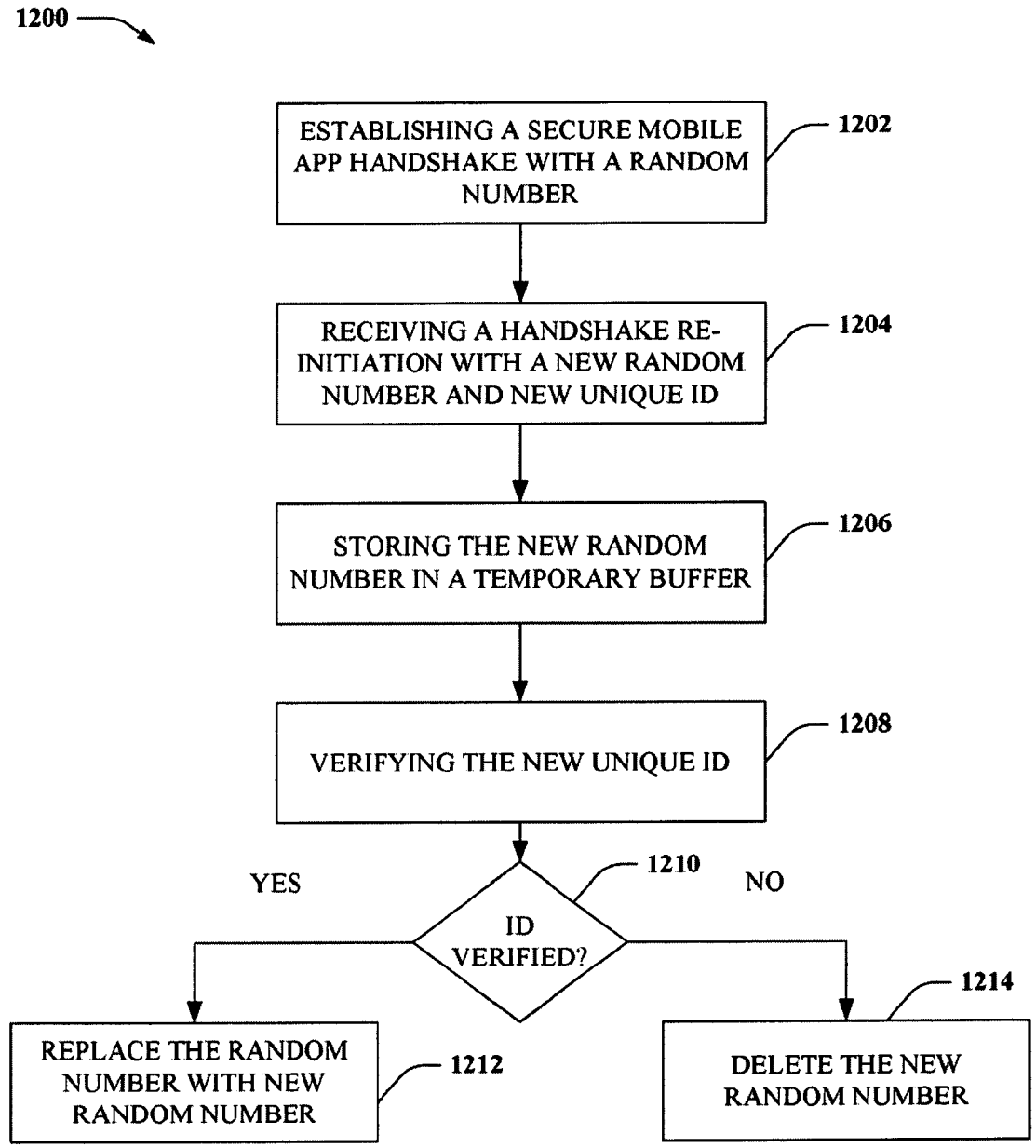
FIG. 12 illustrates an example methodology for receiving a re-initiated handshake in secure communication between mobile applications.

FIG. 12 illustrates an example methodology 1200 for receiving a re-initiated handshake in secure communication between mobile applications. At 1202, a secure mobile application handshake including at least one random number identifying parties to the communication (and, e.g., capable of identifying a subsequent round-trip communication) can be established, as described herein. Additionally, the handshake can also include a unique ID of a primary application that can identify such application as a trusted entity. At 1204, a handshake re-initiation can be received that includes a new random number and the unique ID or a new unique ID. At 1206, the new random number can be stored in a temporary buffer until the new random number is verified. Such verification can include receiving a data established by an application receiving the handshake re-initiation, or by receiving an acknowledgement response (ACK) for successfully sent data that includes the new random number. Accordingly, the application receiving the handshake re-initiation can attempt to filter legitimate data from malicious or un-authorized data from a malicious and/or un-authorized source.

At 1208, the new unique ID can be verified, as described herein. For instance, the new unique ID can be reference with respect to a list of trusted primary application unique IDs. If a match is found, the new unique ID can then identify a particular trusted primary application. If a match is not found, the new unique ID can be assumed to be associated with an un-authorized application(s). At 1210, a determination is made as to whether the new unique ID is verified, as described above. If not, method 1200 proceeds to 1214 where the new random number is deleted and no handshake response is sent. If the new unique ID is verified, method 1200 can proceed to 1212 where the random number can be replaced with the new random number to identify subsequent communication between applications. As described, method 1200 provides a mechanism whereby a handshake can be verified prior to storing a new random number and unique ID, and releasing and/or erasing a prior random number and/or unique ID. As a result, spoofing attacks that attempt to interrupt secure communication by replacing a random number with a false random number can be mitigated.

Figure 13:
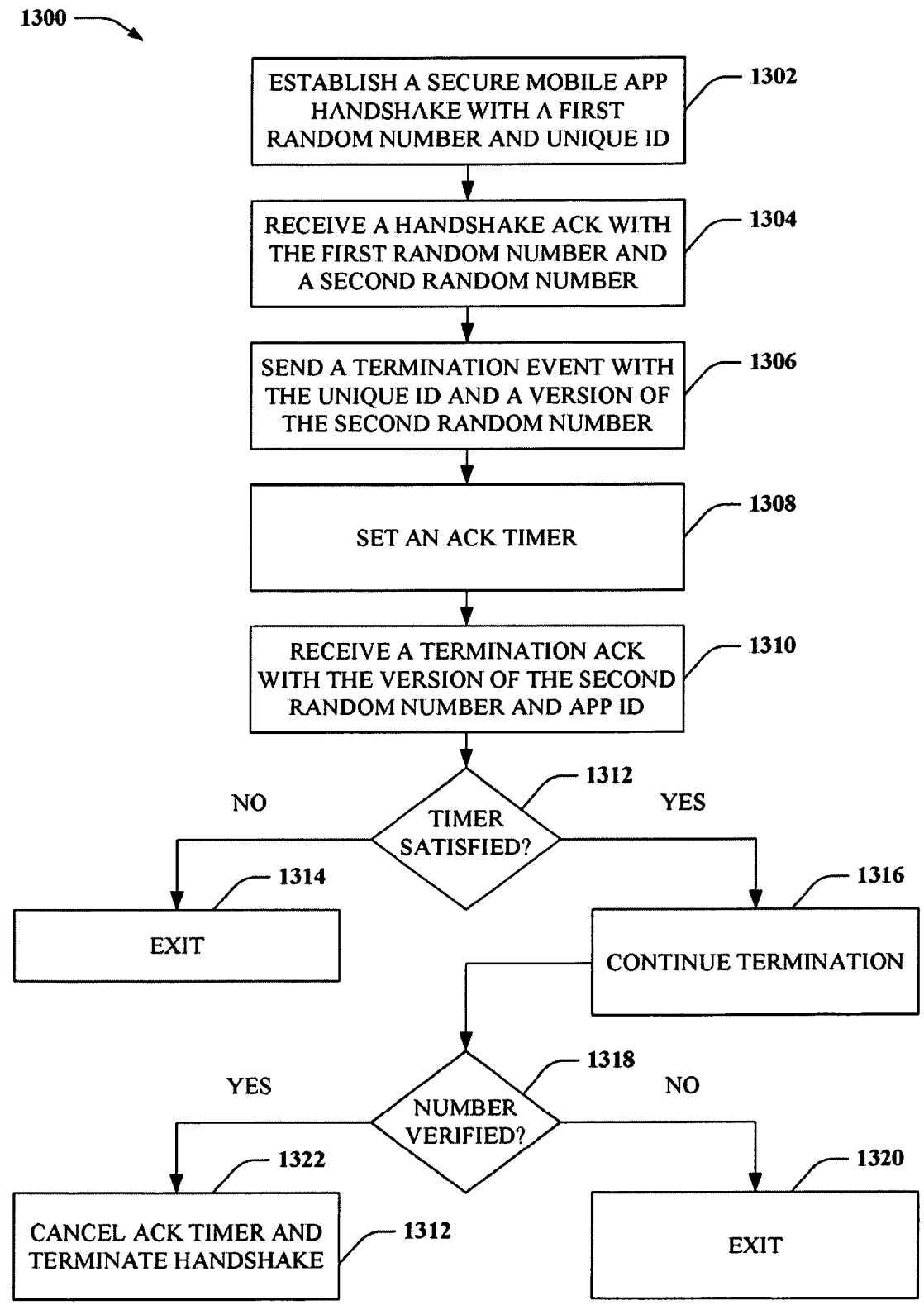
FIG. 13 illustrates an example methodology for terminating a handshake.

FIG. 13 provides a flowchart of an example methodology 1300 for terminating a handshake according to aspects of the subject disclosure. At 1302, method 1300 can establish a secure mobile app handshake that includes at least a first random number and/or a unique ID of an initiating application. The first random number can identify that a handshake ACK received by the initiating application is from a target of the handshake. Further, the unique ID can indicate to the target that the initiating application is authorized to send a handshake to such target.

At 1304, a handshake ACK can be received that includes at least the first random number and/or a second random number. The first random number can be received in the same form as it was sent, or in an encrypted form, or a hashed form, or the like, as described herein. A comparison of the received first number (or a suitable hashed or encrypted version thereof) with the first random number can identify that the ACK is legitimate. If the ACK is not legitimate, a handshake re-initiation can be sent, and/or communication can be ended as described herein.

At 1306, a termination event can be initiated that includes at least the unique ID and a version of the second random number. The version can be, for instance, an increment of the second random number. The version can also be a hashed or encrypted form of such number, or the like. At 1308 an ACK timer can be set to establish a return trip time for an ACK of the termination event. The ACK timer can be based on a round-trip time associated with the secure mobile app handshake and the handshake ACK, for instance. At 1310, a termination ACK is received. The termination ACK can include at least the second random number, or a suitable version thereof, or an application ID of the target application, or both.

At 1312, a determination is made as to whether the ACK timer is satisfied. Specifically, whether the termination ACK is received within a timeframe set by the ACK timer. If not, method 1300 proceeds to 1314 where the handshake is exited and further communication is ignored until a successful handshake as conducted, for instance as described at reference number 1302. Exiting the handshake can include refraining data event transmissions for the handshake, zeroing all random numbers generated under the handshake, and/or releasing specific data pertaining to applications involved in the handshake.

If the timer is satisfied at reference number 1312, method 1300 proceeds to 1316 where the termination event continues. At 1318, a determination is made as to whether the version of the second random number received with the termination ACK at reference number 1310 is correctly repeated, incremented, hashed, or encrypted, or a suitable combination thereof. If the second random number received with the termination ACK is appropriate, method 1300 can proceed to 1320 where the ACK timer is cancelled and handshake termination completed. Completion of handshake termination can include zeroing out numbers generated for the handshake and releasing data pertaining to applications involved in the handshake. If the second random number is determined not appropriate at reference number 1318, method 1300 can proceed instead to 1322 where the handshake is exited, as described at reference number 1314.

Figure 14:
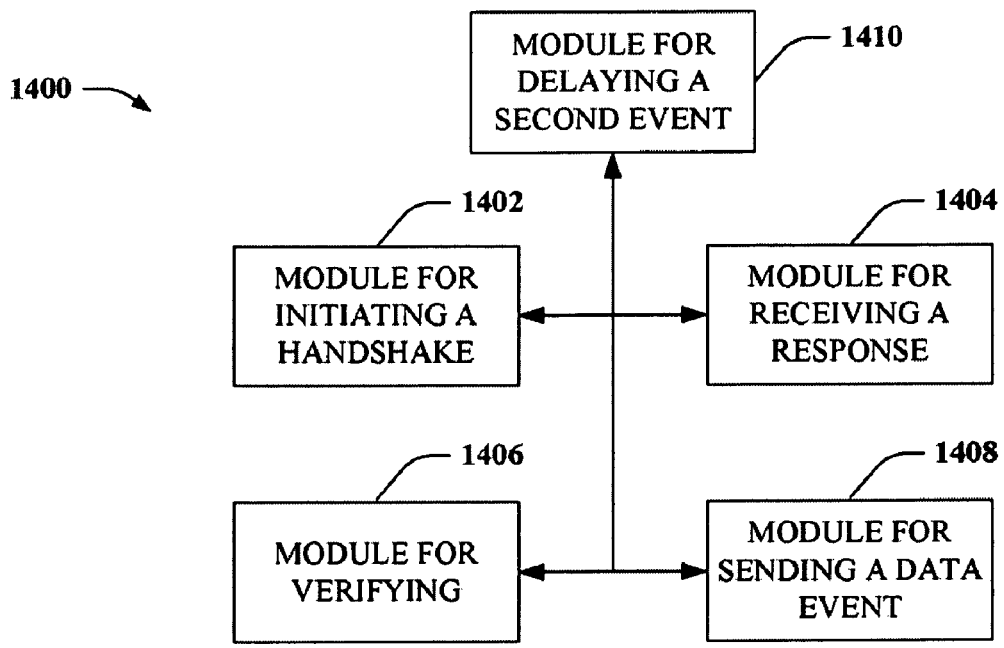
FIGS. 14 and 15 illustrate sample block diagrams of systems for initiating and receiving, respectively, secure communications in a mobile operating environment.
Figure 15:
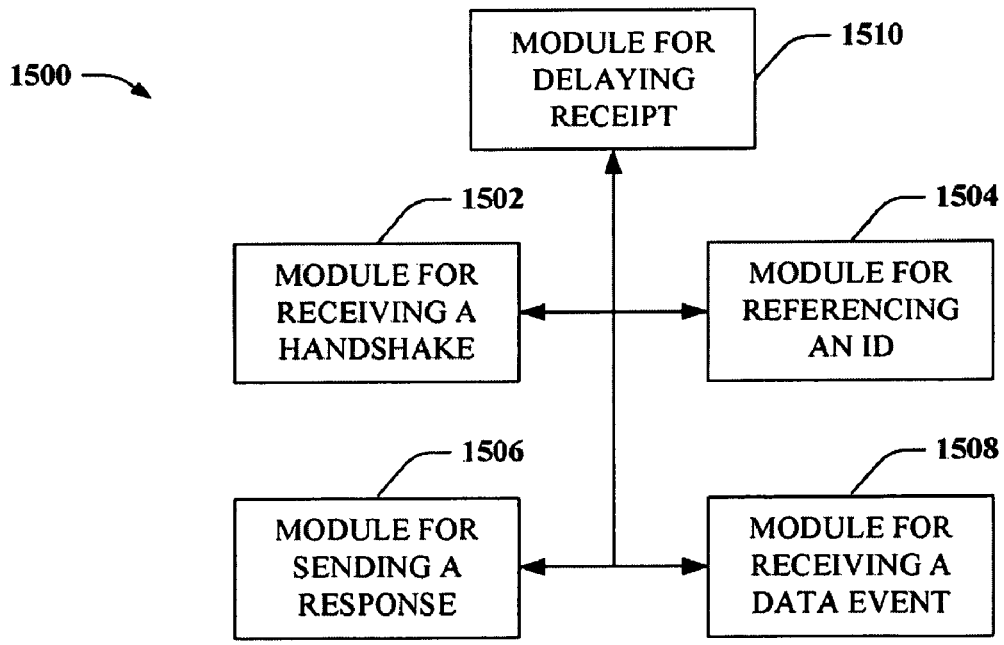

FIGS. 14 and 15 provide block diagrams of sample systems (1400, 1400) in accordance with particular aspects of the claimed subject matter. Specifically, system 1400 can provide for initiating and participating in secure inter-application communication in a mobile operating environment. For instance, system 1400 can include a module for initiating a handshake 1402. Specifically, the module 1402 can initiate a handshake with a mobile application that includes a unique identifier of a primary mobile application and a random number generated for the handshake. Further, system 1400 can include a module for receiving a response 1404. The module 1404 can specifically receive a response to the handshake initiated by the module 1402, wherein the response includes a first number and a second number. The second number can, for example, be randomly generated by the mobile application (e.g., a determined target of the handshake) and can be utilized to sign and/or certify requests sent to the mobile application from the primary application.

In addition to the foregoing, system 1400 can include a module for verifying data 1406. The module 1406 can verify whether the first number received as part of the handshake response is the random number (or, e.g., a hashed and/or truncated version thereof, or an increment thereof, or both) generated for the handshake. Also included is a module for sending a data event 1408. The module 1408 can initiate and send a data event to the mobile application that includes an increment of the second random number (e.g., generated by the mobile application) if the first number is verified as the random number by module 1406. Moreover, system 1400 can also include a module for delaying a second data event 1410. The module 1410 can delay processing and/or transmission of a second data event by system 1400 at least until a data event response is received from the mobile application that includes at least the increment of the second random number. As a result, system 1400 can enforce round-trip synchronous communication policies in a secure communication environment, that incorporates at least randomly generated numbers to identify and/or certify inter-application data requests.

In addition to the foregoing, system 1500 can include a module for receiving a handshake request 1502. Particularly, the module 1502 can receive a handshake request from a primary application that includes at least a unique ID of the primary application or a random number generated by the primary application, or both. Additionally, system 1500 can include a module for referencing an ID 1504 that can reference a received unique ID, if any, against a list of trusted primary application identifiers. Such a reference can be utilized to distinguish trusted applications from un-authorized or un-trusted applications. Furthermore, system 1500 can include a module for sending a handshake response 1506. The module 1506 can send a handshake response to the primary application if the unique ID matches a unique ID of the list of trusted primary application identifiers, as determined by the module 1504. In addition to the foregoing, system 1500 can also include a module for receiving a data event request 1508, and a module for delaying receipt of such request (e.g., where receipt can include some form of data processing on received data aside from buffering and/or setting a process timer as described herein). Specifically, the module 1510 can delay receipt of additional data requests until a response to the data event request is initiated by system 1500. Accordingly, round-trip policies can be enforced, also enabling re-transmission of lost requests and/or re-initiation of handshake events in data transfer between mobile applications. As a result, an efficient data transfer architecture can be provided for synchronous communication in a packet loss environment where data is not lost or useless as a result of one or more lost packets.

What has been described above includes examples of one or more aspects. It is, of course, not possible to describe every conceivable combination of components or methodologies for purposes of describing the aforementioned aspects, but one of ordinary skill in the art may recognize that many further combinations and permutations of various aspects are possible. Accordingly, the described aspects are intended to embrace all such alterations, modifications and variations that fall within the scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method for providing transmission of data between applications in a mobile operating environment, comprising:
   initiating, by at least one circuit, a handshake with a mobile application that includes a unique identifier of a primary mobile application and a random number generated for the handshake;
   receiving and verifying a response to the handshake, the response includes at least a second number;
   sending a data event to the mobile application that includes the second number or a version of the second number, if the response to the handshake is verified; and
   freezing execution of the primary application until a data event response from the mobile application is received, the data event response includes at least the second number or the version of the second number.

2. The method of claim 1, further comprising re-transmitting the data event if the data event response is not received from the mobile application.

3. The method of claim 1, further comprising executing a configurable number of data event re-transmissions until the data event response is received.

4. The method of claim 3, further comprising determining a packet loss frequency or likelihood in an interface between the mobile application and the primary mobile application to establish the configurable number of data event re-transmissions.

5. The method of claim 3, further comprising re-initiating the handshake if the data event response is not received after the configurable number of data event re-transmissions are executed.

6. The method of claim 1, further comprising re-initiating the handshake if the response to the handshake or the data event response is not received from the mobile application within a threshold period.

7. The method of claim 1, further comprising at least one of:
   employing a hash function to transform the random number or to generate the version of the second number;
   truncating the random number or the second number to enable transmission of larger numbers than an application interface can otherwise accommodate;
   incrementing the second number to generate the version of the second number; or
   encrypting the second number to generate the version of the second number.

8. The method of claim 1, further comprising initiating a handshake termination if the second number is not verified as the random number.

9. The method of claim 1, further comprising employing a single mobile device to execute and communicatively couple the mobile application and the primary mobile application.

10. The method of claim 1, further comprising employing a first device to store and execute the primary mobile application and a second device, remotely located from the first device, to store and execute the mobile application, wherein the first and second devices are communicatively coupled by a wired or wireless network, or both.

11. The method of claim 1, further comprising:
    computing an anticipated response time from the time required between initiating the handshake and receiving the response to the handshake; and if the data event response is not received within the anticipated response time, at least one of:
    terminating communication with the mobile application until a subsequent handshake is initiated and verified; or
    re-transmitting the data event.

12. An apparatus for providing transmission of data between applications in a mobile operating environment, comprising:
    at least one memory for storing modules; and
    at least one circuit for executing:
       a secure session module configured to initiate a handshake with a recipient application, wherein the handshake includes a unique ID of a primary application and a random number;
       a verification module configured to receive and verify a response to the handshake, the response includes at least a second number;
       a communication module configured to send a data event to the recipient application that includes the second number or a version of the second number, if the response to the handshake is verified; and
       a transmission management module configured to freeze execution of the primary application until a data event response from the mobile application is received, the data event response includes at least the second number or the version of the second number.

13. The apparatus of claim 12, wherein the communication module re-transmits the data event if the data event response is not received from the recipient application.

14. The apparatus of claim 12, wherein the at least one circuit is further for executing a transmission reliability module configured to determine a packet loss likelihood or frequency between the primary application and the recipient application and to establish a number of re-transmissions for unacknowledged data events based on the determined packet loss.

15. The apparatus of claim 14, wherein the secure session module re-initiates the handshake if the data event response is not received after the number of re-transmissions are executed.

16. The apparatus of claim 12, wherein the secure session module re-initiates the handshake if at least one of:
    the response to the handshake or the data event response is not received from the mobile application within a threshold period;
    a handshake refresh time expires; or
    a handshake initiation command is received from a device user interface.

17. The apparatus of claim 12, wherein the at least one circuit is further for executing a hashing module configured to at least one of:
   hash, truncate, encrypt, or increment, or a combination thereof, the random number; or
   hash, truncate, encrypt or increment, or a combination thereof, the second number to generate the version of the second number.

18. The apparatus of claim 12, wherein the secure session module is configured to initiate a handshake termination if at least one of:
   the second number is not verified as the random number;
   a handshake response is not received to a predetermined number of handshakes; or
   a communication session is complete.

19. The apparatus of claim 12, wherein a single mobile device executes and communicatively couples the mobile application and the primary mobile application.

20. The apparatus of claim 12, wherein a first and a second remote processing device communicatively coupled via a wired or wireless network, at least one of which is a mobile device, execute the recipient application and the primary application, respectively.

21. The apparatus of claim 12, further comprising a timing component configured to compute an anticipated response time between the primary and recipient applications based at least in part on a time between receiving and initiating the handshake, wherein the communication module re-transmits the data event if the data event response is not received within the anticipated response time.

22. The apparatus of claim 12, further comprising a processing buffer configured to enable the primary application to receive and buffer a data event response or a handshake response without interrupting other operations of the primary application.

23. At least one processor that provides transmission of data between applications in a mobile operating environment, comprising:
   a first circuit for executing a module; and
   at least one second circuit for executing:
      a first module that initiates a handshake with a mobile application that includes a unique identifier of a primary mobile application and a random number generated for the handshake;
      a second module that receives and verifies a response to the handshake, the response includes at least a second number;
      a third module that sends a data event to the mobile application that includes the second number or a version of the second number, if the response to the handshake is verified; and
      a fourth module that freezes execution of the primary mobile application until a data event response is received that includes at least the increment of the second number.

24. An apparatus that provides transmission of data between applications in a mobile operating environment, comprising:
   a memory for storing one or more instructions executable by at least one circuit;
   means for initiating, by the at least one circuit, a handshake with a mobile application that includes a unique identifier of a primary mobile application and a random number generated for the handshake;
   means for receiving and verifying a response to the handshake, the response includes at least a second number;
   means for sending a data event to the mobile application that includes the second number or a version of the second number, if the response to the handshake is verified; and
   means for freezing execution of the primary mobile application until a data event response is received that includes at least the increment of the second number.

25. A non-transitory computer-readable medium having one or more instructions for providing data transmission security for mobile environment applications, which when executed by a processor causes the processor to:
   initiate a handshake with a mobile application that includes a unique identifier of a primary mobile application and a random number generated for the handshake;
   receive and verify a response to the handshake, the response includes at least a second number;
   send a data event to the mobile application that includes the second number or a version of the second number, if the response to the handshake is verified; and
   freeze execution of the primary mobile application until a data event response is received that includes at least the second number or the version of the second number.

26. A method for providing data transmission between applications in a mobile operating environment, comprising:
   receiving, by at least one circuit, a handshake request from a primary application that includes a unique ID of the primary application or a random number generated by the primary application;
   referencing the unique ID against a list of trusted primary application identifiers;
   sending a handshake response to the primary application if the unique ID matches an ID of the list of trusted primary application identifiers;
   receiving a data event request; and
   responding to the data event request prior to receiving or processing additional data event requests.

27. The method of claim 26, further comprising including the random number or a second random number generated to identify communication originating from a recipient application, or both, within the handshake response.

28. The method of claim 27, further comprising:
   allocating a data buffer for the data event;
   copying data included within the data event to the data buffer;
   setting a process timer based at least in part on an estimated time to complete a current process; and
   refraining from processing the data included within the data event until expiration of the process timer.

29. The method of claim 27, further comprising receiving an increment of the second random number within the data event request.

30. The method of claim 27, further comprising including an increment of the second random number or an application ID of the recipient application, or both, within a response to the data event request.

31. The method of claim 26, further comprising including an increment of the random number in conjunction with data responsive to the data event request within a response to the data event request.

32. The method of claim 26, further comprising ignoring the data event request and subsequent data event requests until a subsequent handshake event with a trusted unique ID is received if the data event request does not include a current increment of the second random number.

33. The method of claim 26, further comprising:
receiving a handshake re-initiation message that includes a new random number and either the unique ID or a second unique ID;
storing the new random number in a temporary buffer;
verifying the unique ID or the second unique ID matches an ID of the list of trusted primary application identifiers; and
one of replacing the random number with the new random number if the unique ID or the second unique ID is verified or clearing the new random number from the temporary buffer if the unique ID or the second unique ID is not verified.

34. The method of claim 26, further comprising:
sending a recipient data event request to the primary application; and
delaying sending of a second recipient data event request at least until a response to the recipient data event request is received.

35. The method of claim 34, further comprising receiving a response from the primary application that includes the increment of the random number or the unique ID of the primary application, or both.

36. The method of claim 34, further comprising at least one of:
re-sending the recipient data event request a configurable number of times unless a response to the recipient data event request is received; or
refrain from sending the recipient data event request until a subsequent handshake is received that has at least a verified primary application class ID, if no response to the recipient data event request is received after a configurable number of requests are sent.

37. An apparatus that provides data transmission between applications in a mobile operating environment, comprising:
at least one memory for storing modules; and
at least one circuit for executing:
a security module configured to receive a handshake request from a primary application that includes a unique ID of the primary application or a random number generated by the primary application;
a reference module configured to verify the unique ID against a list of trusted primary application identifiers;
an interface module configured to send a handshake response to the primary application if the unique ID matches an ID of the list of trusted primary application identifiers and configured to receive a data event request; and
a management module configured to require the interface module to respond to the data event request prior to receiving additional data event requests.

38. The apparatus of claim 37, wherein the handshake response includes the random number, or a second random number generated to identify communication responsive to a recipient application, or both.

39. The apparatus of claim 38, wherein the management module is further configured to at least one of:
allocate a data buffer for the data event;
copy data included within the data event to the data buffer;
set a process timer based at least in part on an estimated time to complete a current process; and
prevent a recipient application from processing the data included within the data event until expiration of the process timer.

40. The apparatus of claim 38, wherein the data event request includes at least an increment of the random number.

41. The apparatus of claim 38, wherein the management module permits a response to the data event request that includes an increment of the second random number or an application ID of the recipient application, or both.

42. The apparatus of claim 37, wherein the management module permits the interface module to send a data event request that includes an increment of the random number in conjunction with a request for data or an instruction for execution by the primary application, or both.

43. The apparatus of claim 37, wherein the management module ignores the data event request and subsequent data event requests until a subsequent handshake event with a trusted unique ID is received if the data event request does not include a current increment of the second random number.

44. The apparatus of claim 37, wherein the management module is further configured to at least one of:
receive a handshake re-initiation message that includes a new random number and either the unique ID or a second unique ID;
store the new random number in a temporary buffer;
verify the unique ID or the second unique ID matches an ID of the list of trusted primary application identifiers; or
one of replace the random number with the new random number if the unique ID or the second unique ID is verified or clear the new random number from the temporary buffer if the unique ID or the second unique ID is not verified.

45. The apparatus of claim 37, wherein:
the interface module sends a recipient data event request to the primary application; and
the management module delays sending of a second recipient data event request at least until a response to the recipient data event request is received by the interface module.

46. The apparatus of claim 45, wherein the response to the recipient data event request received by the interface module includes the increment of the random number or the unique ID of the primary application, or both.

47. The apparatus of claim 46, wherein at least one of:
the interface module re-sends the recipient data event request a configurable number of times unless a response to the recipient data event request is received; or
the management module prevents the interface module from sending the recipient data event request until a subsequent handshake is received that has at least a verified primary application class ID, if no response to the recipient data event request is received after a configurable number of requests are sent.

48. At least one processor that provides data transmission between applications in a mobile operating environment, comprising:
a first circuit for executing a module; and
at least one second circuit for executing:
a first module that receives a handshake request from a primary application that includes a unique ID of the primary application or a random number generated by the primary application;
a second module that references the unique ID against a list of trusted primary application identifiers;
a third module that sends a handshake response to the primary application if the unique ID matches an ID of the list of trusted primary application identifiers;
a fourth module that receives a data event request; and
a fifth module that responds to the data event request prior to receiving additional data event requests.

49. An apparatus that provides data transmission between applications in a mobile operating environment, comprising:
- a memory for storing one or more instructions executable by at least one circuit;
- means for receiving, by the at least one circuit, a handshake request from a primary application that includes a unique ID of the primary application or a random number generated by the primary application;
- means for referencing the unique ID against a list of trusted primary application identifiers;
- means for sending a handshake response to the primary application if the unique ID matches an ID of the list of trusted primary application identifiers;
- means for receiving a data event request; and
- means for delaying receipt of additional data event requests until a response to the data event request is initiated.

50. A non-transitory computer-readable medium having one or more instructions for providing data transmission between applications in a mobile operating environment, which when executed by a processor causes the process to:
- receive a handshake request from a primary application that includes a unique ID of the primary application or a random number generated by the primary application;
- reference the unique ID against a list of trusted primary application identifiers;
- send a handshake response to the primary application if the unique ID matches an ID of the list of trusted primary application identifiers;
- receive a data event request; and
- respond to the data event request prior to receiving additional data event requests.

* * * * *